(12) United States Patent
Howard

(10) Patent No.: US 7,118,118 B1
(45) Date of Patent: Oct. 10, 2006

(54) STEER WHEEL CONTROL SYSTEM WITH DUAL PISTONS CONNECTED TO A COMMON SHAFT

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 305 days.

(21) Appl. No.: 10/871,672

(22) Filed: Jun. 18, 2004

(51) Int. Cl.
*B62D 7/22* (2006.01)

(52) U.S. Cl. .................................. 280/89.11; 280/90

(58) Field of Classification Search ............ 280/89.11, 280/89.13, 90, 89
See application file for complete search history.

(56) References Cited

U.S. PATENT DOCUMENTS

| | | | |
|---|---|---|---|
| 962,257 A * | 6/1910 | Rockwell ................. 91/4 A |
| 2,509,570 A | 5/1950 | Lee |
| 2,760,518 A | 8/1956 | Peet |
| 3,075,576 A | 1/1963 | Herbert |
| 3,169,551 A | 2/1965 | Lewis |
| 3,230,975 A | 1/1966 | Mercier |
| 3,318,251 A | 5/1967 | Smith |
| 3,730,307 A | 5/1973 | Mitchell |
| 3,756,367 A | 9/1973 | Mitchell et al. |
| 3,792,721 A | 2/1974 | Zahid |
| 3,857,413 A | 12/1974 | Zahid |
| 3,863,947 A | 2/1975 | Weston |
| 3,870,335 A | 3/1975 | Schultz |
| 3,882,953 A | 5/1975 | Maisch |
| 3,882,954 A | 5/1975 | Inoue |
| 3,887,027 A | 6/1975 | Allison |
| 3,897,846 A | 8/1975 | Inoue |
| 3,958,656 A | 5/1976 | Niemann |
| 3,960,179 A | 6/1976 | Zahid |
| 3,961,646 A | 6/1976 | Schon |
| 4,008,782 A | 2/1977 | Chanal |
| 4,088,154 A | 5/1978 | Patton et al. |
| 4,349,079 A | 9/1982 | Leiber |
| 4,359,123 A | 11/1982 | Haupt et al. |
| 4,410,193 A | 10/1983 | Howard |
| 4,418,931 A | 12/1983 | Howard |
| 4,467,884 A | 8/1984 | Robertson et al. |
| 4,503,678 A | 3/1985 | Wimbush |
| 4,506,507 A | 3/1985 | Wimbush |
| 4,534,577 A | 8/1985 | Howard |
| 4,558,878 A | 12/1985 | Motrenec |
| 4,566,712 A | 1/1986 | Motrenec |
| 4,585,400 A | 4/1986 | Miller |
| 5,527,053 A | 6/1996 | Howard |
| 5,536,028 A | 7/1996 | Howard |
| 6,003,887 A | 12/1999 | Howard |

(Continued)

FOREIGN PATENT DOCUMENTS

DE         1901588         6/1969

*Primary Examiner*—Paul N. Dickson
*Assistant Examiner*—Drew J. Brown
(74) *Attorney, Agent, or Firm*—Townsend M. Belser, Jr.; Nexsen Pruet Adams Klemeier, LLC

(57) ABSTRACT

A steering system control apparatus for resisting off-center movement of the steer wheels of a vehicle and returning them to a selected center position after each such movement. A centering shaft is connected to the steering shaft from a steering gear for rotational reciprocation therewith and an intermediate rotational position thereof defines a centering position that is remotely adjustable by trimming pistons to vary the selected center position of the steering system during vehicle operation. A holding force and a return force are applied to the centering shaft via a member moveable through an arc and acted upon by centering pistons.

22 Claims, 9 Drawing Sheets

U.S. PATENT DOCUMENTS

| | | |
|---|---|---|
| 6,422,582 B1 | 7/2002 | Howard |
| 6,491,313 B1 * | 12/2002 | Rui et al. .................. 280/90 |
| 6,520,519 B1 | 2/2003 | Howard |
| 6,520,520 B1 | 2/2003 | Howard |
| 6,530,585 B1 * | 3/2003 | Howard .................. 280/89.11 |
| 6,994,361 B1 * | 2/2006 | Howard .................. 280/89.11 |
| 2004/0056443 A1 * | 3/2004 | Howard .................. 280/89.11 |

* cited by examiner

STEER WHEEL CONTROL SYSTEM WITH DUAL PISTONS CONNECTED TO A COMMON SHAFT

FIELD OF THE INVENTION

This invention relates to vehicle steering systems and more particularly to a device for holding the steer wheels of a motor vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway motor vehicles and the like are designed primarily for driver control. In these systems, the steering force required on the steering wheel and the ratio between steering wheel movement and movement of the steered ground wheels (steer wheels) depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

In the past, motor vehicle steering systems have provided some steering wheel returnability by slanting the king pins of the steer wheels so that their top ends are aft of their bottom ends. This is referred to as a positive king pin angle and produces a turning-lift effect that provides some steering wheel returnability as explained further below. The use of positive king pin angles involves compromises over the full steering spectrum because it results in positive caster offset and thereby produces castering of the steer wheels. For example, the adverse effects of strong gusty cross winds are more pronounced with large amounts of positive caster offset. As its name would imply, the vehicle tends to caster towards the side of the roadway to which it is being pushed by the wind. Thus, the adverse steering inputs caused by crosswinds are directly related to the amount of positive king pin angle, which is a classic example of having to balance a benefit with a detriment.

Any small amount of stability gained on a non-windy day from slanting the steer wheel king pins may be paid for many times over when driving in a crosswind because of the destabilizing castering effect of the crosswind. Similarly, a high crown at the center of the roadway or a slanted roadway tends to cause vehicles with castered steer wheels to turn toward the edge of the roadway, that is, in the downhill direction. Castered steer wheels also allow steering inputs from rutted and other imperfect roadway surfaces to steer back against the driver and thereby cause road wander, which is a universal driving complaint, particularly by driver's of heavy vehicles such as trucks and motor homes. In addition, due to increased turning-lift effects, generous positive king pin angles provide significant resistance to small radius turns, which can make city driving quite fatiguing. These adverse effects are some of the negative aspects of attempting to achieve steering system stability through generous amounts of positive king pin angle.

Another drawback of prior art steering systems is that spurious inputs transmitted from the roadway through the steer wheels affect substantially the entire steering assembly before encountering any stabilizing resistance from the steering wheel. The transmission of these inputs between the steer wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

For lack of a more advanced method, slanting of the steer wheel king pin has been accepted by the industry in the past as a low-cost method of achieving steer wheel returnability. Accordingly, many over-the-road vehicles are provided with generous amounts of positive caster offset. Not much thought has been given by others to the self-defeating side effects of steer wheel castering. Keeping a vehicle tracking straight and under control currently requires an inordinate amount of driver steering corrections to counteract the adverse side effects of castered steer wheels. The repetitive task of making numerous precise steering corrections mile after mile weighs heavily on a driver's physical and mental well-being, and may result in extreme driving fatigue. Thus, a highly important consideration that has long been overlooked by the industry is that steer wheel castering is directly responsible for road wander, crowned road steering wheel pull and cross wind steering problems. The failure of the industry to recognize the critical need to provide directional stability by replacing slanting of the king pins with another method of achieving steer wheel returnability may go down in history as one of the longest enduring vehicle design oversights.

My Precision Steer Wheel Control Technology (PSWCT) has brought to light incorrect technical assumptions that have been responsible for this long-standing major vehicle design oversight, which has in effect been responsible for a lack of heavy vehicle directional stability and related highway safety issues. The heavy vehicle industry has made amazing progress in advancing the state of the art in heavy vehicle design with the exception of recognizing the critical need for directional stability. For over a half a century, the driving of heavy vehicles that are lacking in directional stability has required an inordinate amount of corrective driver steering to keep the vehicle going straight and under control. To be directionally stable, a vehicle's steering system must be designed so that the steer wheels track exceptionally straight without requiring repetitive driver steering corrections to keep the vehicle under directional control, thereby greatly reducing the driver work-load. It has been shown that the industry-wide method of slanting the king pins of the steer wheels to achieve steering wheel returnability is the major cause of the unstable behavior of the steer wheels, which results in driver fatigue and a surprising number of other drivability and operational problems.

While this low-cost simple method of achieving steering wheel returnability is desirable from a manufacturing point of view, the resultant operational problems are very undesirable to the consumers, especially to the heavy vehicle drivers who must endure the million upon millions of miles that are many times more fatiguing to drive than they would be in a directionally stable vehicle that is not adversely affected by crosswinds. Historians will find it hard to rationalize how the hundred-year-old method of achieving steering wheel returnability by the "turning-lift effect" could have been used for so long, without steer wheel castering problems being recognized for their negative effect on heavy vehicle drivability. It was not for the lack of consumer complaints about the repetitive steering corrections required to maintain directional control in spite of road wander and steering wheel pull, about crosswind driving fatigue, and about the cost of accelerated steer wheel tire wear.

In fairness to the presently very capable heavy vehicle design community, the industry-wide endorsement of the long standing heavy vehicle steering and control methodology was established before their time, and had been universally accepted throughout the heavy vehicle industry as a cost-effective method of dealing with heavy vehicle steering requirements. Because the consumers' only choice has been to accept the lack of heavy vehicle directional stability and the related drivability problems as normal, other more pressing problems that the consumers were aware of were given priority over advancing the state of the art in heavy vehicle drivability.

Castering and the turning-lift effect may be further explained as follows with reference to prior art FIGS. 1 to 3. In the beginning when the horseless carriage first took to the road, uncomplicated simple technology was of great importance. As a product improvement, the steering tiller initially was traded for a steering wheel that presented a problem because the steering wheel would stay turned after turning a corner. The lack of steering wheel returnability was solved by the simple method of slanting the pivot axis A1 of a steer wheel king pin 2 aft at the top end to accomplish a turning-lift effect created when the steer wheel 3 was turned to the aft side of the slanted king pin, which moved the turning steer wheel downward by a small amount relative to the vehicle frame as illustrated by broken line 3' in FIG. 1. This downward wheel movement in turn lifted the vehicle frame (not shown) by the same small amount, which is represented by the lift height L1 between the arrows marked "Lift". When the vehicle driver releases the steering wheel after turning, the weight of the vehicle then causes the steer wheel that turned to the aft lower side of the slanted king pin and thereby lifted the vehicle, to return toward the lower most on-center driving position represented by the solid line steer wheel 3.

To better understand the turning-lift effect, a graphic example that almost everyone is familiar with is the post of a farm gate that becomes slanted with the passage of time due to the weight of the gate in its closed position. When the gate 10 is opened in either direction, the low end of the gate is lifted by turning it toward a non-slanting side of the post 9 on a pair of hinges 8,8, creating a turning lift effect as illustrated in prior art FIG. 2 by the broken line 11, which shows a turned position of gate 10, and the lift height L2 between the arrows marked "Lift". When the gate is released, its weight will cause it to swing back toward the lower closed position represented by the solid line gate 10 in FIG. 2. On either side near the gate's closed position, the turning-lift effect diminishes and becomes almost neutral such that its weight alone is not able to hold the gate in the fully closed position, requiring a suitable latch mechanism to keep it fully closed. In a similar manner to the turning lift of the farm gate, when the steer wheels of a vehicle return toward their lowermost on-center, straight ahead position, the turning-lift effect also diminishes and does not have enough centering force to keep the steer wheels tracking straight in the on-center driving position. Therefore, the unstable behavior of the steer wheels near the on-center position requires that they be constantly controlled by corrective driver steering input.

The inherent lack of steer wheel directional stability in the on-center driving position is made worse because the same slanted king pin angle that produces the turning-lift effect also produces a steer wheel castering effect that greatly adds to the unstable behavior of the steer wheels during crosswind and crowned road driving conditions. It is amazing that the adverse effect of steer wheel castering has failed to be better understood over the many years because of an original misleading choice of terms. It can be reasoned that in the beginning the shorter term, caster angle, was probably chosen over the more complex term, turning-lift angle, considering that the angles were one and the same.

For as long as anyone can remember, the standard reference for the required king pin angle in vehicle specification manuals has always been referred to in degrees of caster angle. Therefore, it is not surprising that it has been mistakenly assumed throughout the industry that steer wheel castering in some manner is beneficial to heavy vehicle drivability, when in fact the opposite is true. Accordingly, many of the text books and engineering papers that have been written about heavy vehicle steering geometry have repeated the mistaken assumption that castering the steer wheels makes a contribution to the directional stability of heavy over-the-road vehicles. Unfounded theories, attempting to explain how the castered wheel functions to make a vehicle directionally stable, have been repeated in various technical publications, greatly adding to the confusion.

It is also amazing how anyone whose desk chair has castered wheels, which allow the chair to move freely in any direction, could believe in some manner that, when applied to a highway vehicle, castering would keep the steer wheels tracking straight. Referring now to prior art FIG. 3, a castered wheel assembly 13 simply follows the lateral movement of a forward pivot axis A2 that is offset horizontally from a vertical axis A3 by a caster offset distance 6 between the arrows marked "Caster Offset". Axis A3 defines where a castered wheel 12 contacts the ground G, and arrow D3 indicates the direction of wheel rotation during forward lateral movement of wheel assembly 13. As applied to a highway vehicle, the pivot axis A1 of the slanted king pin 2 slants to intersect the ground G forward of where the steer wheel 3 contacts the surface of the ground as defined by a vertical axis A4. Axis A4 is offset horizontally from the pivot axis A3 by a caster offset distance 5 between the arrows marked "Caster Offset" in FIG. 1. Also in this figure, arrow D1 indicates the direction of wheel rotation during forward movement of steer wheel 3, arrow D2 indicates the direction toward which the wheel axle 7 rotates during a right turning movement of right front wheel 3, and 7', 2', 3' and A1' indicate the moved positions of the wheel axle, the king pin, the steer wheel and the king pin pivot axis, respectively, while the right turn is in progress.

A castered steer wheel therefore does not prevent lateral movement of a vehicle, which instead is actually guided by any force acting on the vehicle to cause lateral movement of the offset pivot axis A1. Therefore, during crosswind driving, the castered wheels of a heavy vehicle are guided down-wind by the lateral down-wind movements of the vehicle in response to crosswind gusts, thereby requiring repetitive driver steering corrections to maintain directional control of the vehicle. Crosswind driving is probably the most exhausting driving experience that heavy vehicle drivers must frequently endure because of the repetitive driver steering corrections required to keep the vehicle under control. Crosswind driving is therefore one of the major causes of driving fatigue and related heavy vehicle highway safety issues.

Heavy vehicle steer wheel footprint tests have been conducted using highly accurate instrumentation to measure and record steer wheel activity while driving. During the tests, experienced test drivers made a concerted effort to minimize the corrective steering input to only the amount required to maintain directional control. Any test data that was influenced by inadvertent driver over-steer was not used. Most of the test data was recorded at fifty five (55) miles per hour on a non-windy day on a smooth highway. Therefore, the data is considered to represent a best-case scenario.

According to the test data taken at fifty five (55) miles per hour, the left and right driver steering inputs required to correct the unstable behavior of the steer wheels varied from the on-center position thirty-five to forty thousandths (0.035–0.040) of an inch. When the test driver held the steering wheel steady instead of making the left and right steering corrections required to keep the vehicle directionally under control, the vehicle would make an undesired lane change when the steer wheels were off-center by thirty-five thousandths (0.035) of an inch. When the vehicle speed was increased to sixty-five (65) miles per hour, it only required the steer wheels to be directionally off-center fifteen to eighteen (0.015–0.018) thousandths of an inch to make an undesired lane change. During adverse road and wind conditions, the tests also demonstrated that the unstable steer wheel activity increased substantially, requiring a corresponding increase in driver steering inputs to maintain directional control.

The ideal driving situation is therefore one where the steering system inherently causes the vehicle to travel in an unswerving straight line unless the driver intentionally turns the vehicle in another direction. The ideal steering system should therefore require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steer wheels, and significantly reduces driver fatigue because it results in a major reduction in driver steering inputs. The invention also eliminates the need for positive caster offset by providing directional stability of steer wheels with no positive caster, i.e., a caster angle of zero degrees (0°). Thus, on-center tracking of the steer wheels is achieved by a means that does not have the deficiencies inherent in positive caster offset and that substantially reduces the need for corrective steering inputs from the vehicle driver.

The positive on-center feel of such a directionally stable vehicle provides a new level of driveability for motor vehicles, including automobiles, trucks, buses, campers and motorized homes. The invention thus achieves new levels of directional stability and driveability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering control system goes to work and makes the steered wheels track straight with great accuracy by counteracting spurious steering inputs as described below.

The centering unit section of the centering assembly includes a component that moves with the steering system in response to steering wheel movement, and resistance to movement of this component provides a resistance force opposing very small movements (preferably less than 0.001 inch, more preferably less than 0.0005 inch) of the steer wheels to either side of their center position. Small steer wheel movements in the range of 0.015 to 0.040 inch correspond to the very large radius turns that occur when a vehicle is steered through lane change maneuvers at highway speeds. Thus, during large radius turns, the centering unit provides a centering force that returns the steer wheels back toward their on-center position upon removal of the steering force producing the large radius turn.

More specifically, the centering assembly includes a pair of centering pistons in a corresponding pair of centering cylinders. The central axis of one centering piston and cylinder combination is either parallel to or forms an acute angle with the central axis of the other centering piston and cylinder combination, and the acute angle may be formed by slanting the upper end of one cylinder wall either away from or preferably toward the upper end of the other cylinder wall. The acute angles to either side of parallel may be in the range of 0 to 30 degrees, preferably 0 to 8 degrees, more preferably about 5 degrees, and most preferably the cylinder walls are slanted so that their upper ends converge at acute angles of about 5 degrees to either side of the parallel. Each piston is articulated independently from a common centering shaft by a corresponding piston rod and push arm and is actuated independently for a compressive stroke during a vehicle turning maneuver when its push arm is forcefully engaged by an arcuate bar projecting axially from and rigidly connected to the centering shaft. To provide such independent actuation, when the centering shaft rotates clockwise from its centered position, one side of the arcuate bar forcefully presses against the push arm of one centering piston and, when it rotates counterclockwise from its centered position, the opposite side of the arcuate bar forcefully presses against the push arm of the other centering piston.

The level of steering force required to overcome the steer wheel centering force to initiate a steering movement away from center is sometimes referred to in this specification as the "on-center holding force". Different levels of steer wheel centering force may be appropriate to compensate for different vehicle weights and/or adverse unstable behavior of the steer wheels that the steering geometry does not control or prevent. Because the centering shaft is connected to and rotates with a conventional gear shaft carrying the steering lever known as the "Pitman arm", and fluid in the centering cylinders is pressurized by a fluid accumulator, neither centering piston can move away from a rest position corresponding to the centered position of the centering shaft until a steering force exceeds the on-center holding force dependent on accumulator pressure and the size of the centering pistons. The centering fluid is preferably a liquid pressurized by a gas such as air, although the centering and pressurizing fluids may be either all liquid or all gas. The amount of accumulator pressure is preferably controlled by a pressure regulator, the output pressure of which is adjustable either manually at the regulator or by a remotely actuated solenoid or reversible electric motor.

When a pressing force applied against one or the other of the push arms by the arcuate bar in response to the steering force is sufficient to overcome the on-center holding force, the corresponding centering piston moves away from its center position and, during this compressive movement, it is continuously biased back toward its rest position by accumulator pressure. Thus, the centering force resists relative movement between each centering piston and its corresponding centering cylinder, and this resistance to relative movement between these members prevents any substantial movement of the steer wheels or other steerable member(s) away from their selected center position until the steering force applied to the steering system exceeds a predetermined value corresponding to the level of on-center holding force provided by the centering pistons. The centering force also produces a constant contact pressure between the arcuate bar and the push arms.

The invention also includes a trim assembly that allows small adjustments to be made in the center position of the steering system to fine tune steering of the vehicle. Such fine tuning of the on-center directional stability makes driving more pleasurable and less fatiguing. The steering control system of the invention thus comprises a centering unit having a center position that is adjustable to permit the on-center position of the steering system to be changed and reset (trimmed) to compensate for any change in the on-center trim condition that would otherwise cause the vehicle to deviate from its straight ahead course. Such "trimming" adjustments are made remotely to permit the center position maintained by the centering assembly to be fine tuned while the vehicle is in operation from a location near the driver, which is "remote" relative to the location at which the centering unit is connected to the steering system of the vehicle. Therefore, the driver easily trims out steering wheel pull by the simple touch of a trim switch.

The trimming feature is provided by a pair of trim pistons in a corresponding pair of trim cylinders. The movement of each trim piston in its corresponding trim cylinder actuates the proximate end of a corresponding trim rod, and the distal end of each trim rod serves as an adjustable trim stop for engaging a corresponding one of the push arms on its side opposite to its pushing side when the corresponding centering piston is in its rest position. Trim fluid is supplied to the trim cylinders from a trim fluid source, which is preferably the same as the centering fluid source, and fluid flow from and to the trim cylinders is prevented by corresponding solenoid valves to lock the trim stops in static centering positions until such time as an adjustment is needed in the center position of the steering system.

In the above embodiment, operation of the trim switch causes both solenoid valves to open so that fluid may flow out of one trim chamber and into the other trim chamber. This permits the steer wheels to move freely to a new center position, at which time the trim switch is released to close the solenoid valves so that the trim pistons are locked in a new static position that provides a new centering position for the centering pistons when they are at rest relative to their cylinders in the absence of any turning movement. In other words, altering the position of the trim stops at the distal ends of the trim rods moves the rest positions of the centering piston push arms around the central axis of the centering shaft, which in turn changes the centering position of the actuator bar carried by the centering shaft and thereby the center position of the gear shaft connected thereto, thereby creating a new center position for the pitman arm or other centering lever and the vehicle steering system connected thereto. Although the actuator bar is shown as a single arcuate piece, this actuating means may instead be two separate bars having any desired cross-sectional shape and located at positions corresponding to the two actuating side edges of the single arcuate bar.

The centering chambers may be pressurized by either a gas or a liquid and may be pressurized by an air supply system of the vehicle. The trim chambers must have liquid fluid only to be able to create a hydraulic lock in the trimmed on-center position (zero backlash). However, the pressurizing fluid is preferably provided by a combination hydraulic fluid and gas pressurization system separate from other fluid systems of the vehicle. For example, such gas pressurized hydraulic accumulator systems are described in my prior U.S. Pat. No. 5,536,028, U.S. Pat. No. 6,267,395, U.S. Pat. No. 6,422,582, U.S. Pat. No. 6,520,519 and U.S. Pat. No. 6,520,520, and these systems may be employed for storing and providing hydraulic fluid under pressure to both the centering and trim chambers. Therefore, the entire contents of these prior patents are expressly incorporated herein by reference. Regardless of the type of fluid pressurization system employed, the system should generate sufficient pressure to return each centering piston to its rest position with its push arm fully seated against the stop provided by the distal end of the associated trim rod upon cessation of intentional steering inputs.

Spurious steering inputs tending to move the tie rod in either direction are therefore resisted by a corresponding on-center holding force generated by accumulator pressure acting against the centering pistons via their corresponding centering chambers. Only when intentional steering wheel forces exceed a preselected on-center holding force level will the pitman arm shaft of the steering system generate sufficient rotational force on the centering shaft to rotate it about its rotational axis, thereby causing the actuator bar or bars to move one or the other of the centering pistons. The centering unit thus includes means for remotely and selectively varying both the amount of on-center holding force and the selected center position of the steer wheels relative to the vehicle frame. Both of the remote trim and pressure adjustments can be made by the driver while the vehicle is in operation.

A driver control panel facilitates making such steering corrections while driving the vehicle. The panel may be conveniently located near the driver and provides at least two basic functions, namely, a switch to turn the system on and off, and a momentary trim switch. Activating, adjusting and trimming the centering system is therefore an easy and natural driving function. Should the driver observe any amount of left or right steering wheel displacement required to keep the vehicle tracking straight it is then easily eliminated by pressing the trim switch. This switch preferably has a toggle that is biased by a spring to the circuit opening position. These types of switches are closed only momentarily when the toggle is held in a depressed position against the spring bias. Thus, the solenoids of the trim valves are actuated only while the toggle is actually depressed. Release of the toggle opens the circuit and stops the trimming adjustment at the point selected.

Optionally, the control panel may also include a fluid pressure gauge and a switch for remotely actuating a drive mechanism for adjusting the pressure regulator, thereby providing means for manually controlling centering fluid pressure from the driver's station of the vehicle. Therefore, the level of resistance to movement away from center may be remotely adjusted either by such a manual control system operable by the driver or by a microprocessor control system for actuating the regulator drive mechanism in response to the output of a vehicle speed sensor. Thus, the on-centering force of the present invention may be readily adjustable to provide a low level at low speeds and a high level at speeds above about 35 mph.

Thus, the system parameters may be chosen so that a total on-center holding force of at least 100 pounds, preferably at least 200 pounds, and more preferably at least 300 pounds must be applied to the tie rod in order to overcome the on-centering holding force of the steer wheels at vehicle speeds above about 35 miles per hour. For city driving at vehicle speeds of about 35 miles per hour or less, the on-center holding force required may be lowered to about 100 pounds, more preferably below about 50 pounds, at the tie rod. The centering unit for powered steering systems may be left on continuously because it will automatically turn off with the ignition and come back on when the engine is started. With any malfunction of the vehicle's power steering, an automatic disabling feature may be provided to shut the system completely off.

The centering unit overrides spurious inputs to the steering assembly of vehicles with positive caster so that constant manipulation of the steering wheel by the driver is no longer required to hold the vehicle on a true straight ahead course. When used on steering systems with zero degrees of caster or with positive caster, the invention provides the driver with a positive touch control not heretofore attainable with those types of systems. Positive stability is thereby achieved for otherwise marginally stable or previously unstable steering systems. The invention also provides a distinctive feel when approaching or leaving the center position. Thus, the sense of touch is added to the visual sense to aid control of the vehicle and reduce driver fatigue. The on-center holding force selected should satisfy the road feel desired by the driver and be sufficient to overcome anticipated spurious inputs.

The control system is useable with both power and non-powered steering systems, with the level of centering forces provided usually being less for vehicles without power steering. The invention may be used on steering systems with or without a reduction gear between the steering wheel and the steer wheels. In the former application, the centering unit is preferably connected to the steering system at a location between the steer wheels and the reduction gear, such as to the pitman arm as mentioned above, so as to be unaffected by any slack in the reduction gear or in components and connections between the reduction gear and the steering wheel. It is therefore preferably on the slow side of the reduction gear ratio in order to provide a zero backlash centering unit. The invention is particularly advantageous for large over-the-road motor vehicles, where its use may reduce tire wear by as much as fifty to seventy percent (50–70%) by preventing oscillations of the steer wheels due to steering system geometry and/or driving conditions.

From the consumers' point of view, the present invention, as well as my prior disclosures of PSWCT, solves a number of over-the-road heavy vehicle operational problems, and the cost of its installation may more than be paid for by the savings in steer wheel tire expense alone because it provides precision steer wheel control that greatly reduces or substantially eliminates excessive steer wheel tire wear. These results are achieved because my PSWCT prevents the steer wheels from castering, thereby alleviating or eliminating the drivability problems that have been caused by steer wheel castering. The system also makes the steer wheels track straight by returning them to and/or holding them in their true centered position, thereby doing away with the unstable behavior of the steer wheels that is inherent to the hundred-year-old farm gate turning-lift technology. Thus, the present invention accomplishes one or more of the following improvements in steer wheel control:

(a) advances the state of the art in heavy vehicle directional stability by keeping the steer wheels tracking straight with a high level of precision, greatly reducing the repetitive driver steering input required to maintain directional control, and thereby doing away with long overlooked steering wheel adverse ergonomics problems and making a major reduction in driving fatigue;

(b) achieves relatively easy vehicle controllability during steer wheel tire blowout, and therefore avoids the need for the usual steering wheel fight;

(c) makes a considerable improvement in crosswind drivability by preventing the steer wheels from downwind caster steering in response to wind gusts, thereby making a major reduction in crosswind driving fatigue;

(d) provides heavy vehicle directional stability that greatly reduces the potential for driver over-steer that can easily start an over-steer chain reaction of the type responsible for many loss-of-control highway accidents, and thereby also makes driver training safer and less costly;

(e) significantly reduces or substantially eliminates road wander that is caused by the unstable behavior of the steer wheels that conventional steering geometry does not control or prevent;

(f) does away with steering wheel pull on crowned or slanted roads that is caused by steer wheel caster steering to the low side of the road;

(g) substantially reduces related heavy vehicle accident potentially by reducing driving fatigue;

(h) makes team driving safer because the driving is easier and less fatiguing to the on-duty driver and the off-duty driver gets more rest and sleep due to the non-swaying, directionally stable ride;

(i) makes trucks pulling multiple trailers much less fatiguing and safer to drive, and also much easier for other vehicles to share the highway with because the trailers stay in line with the non-swaying, directionally stable truck; and, (j) provides a solution to the costly steer wheel tire wear problem that has long been an added expense to heavy vehicle operators.

The invention thus greatly reduces tire wear of the steer wheels. Tests of my PSWCT suggest improvements in steer wheel tire service life for over-the-road heavy vehicles in the range of about fifty-five percent to about seventy percent. Heavy vehicles using this technology have exhibited a smooth, non-cupping steer wheel tire wear pattern instead of the costly irregular wear pattern of the past. Unlike the puzzling steer wheel tire wear problem that has perplexed the heavy vehicle industry for years on end, the explanation of how my PSWCT solves the problem is uncomplicated and easy to understand. First, the costly irregular tire wear pattern only occurs on the front steer wheels due to the unstable behavior inherent in conventional steering geometry. Second, when this unstable behavior of the steer wheels is prevented by my PSWCT, these wheels are made to track in a directionally stable manner with the same precision as the wheels on the nonsteering rear axles. Therefore, the tires have the same smooth wearing tread and the same normal extended service life as those on the fixed non-steering rear axles.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF PREFERRED EMBODIMENTS

Figure 1:
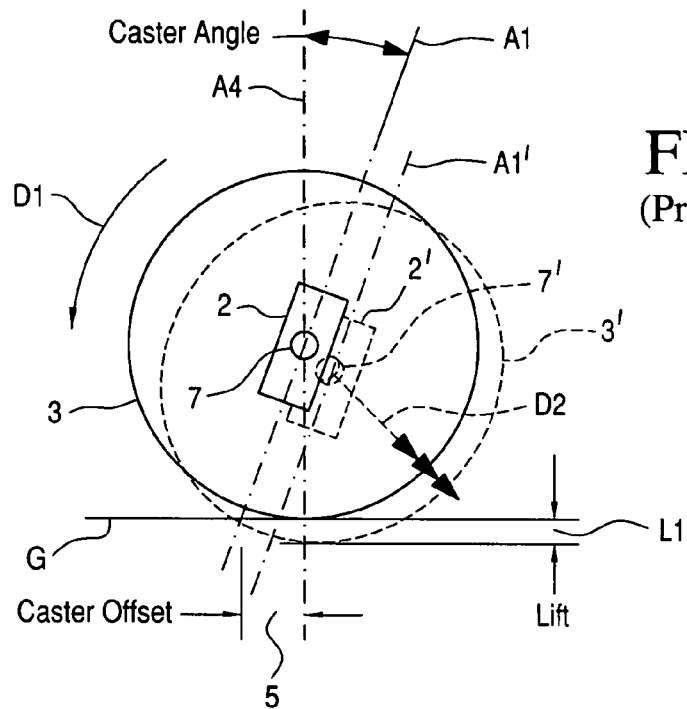
FIG. 1 illustrates the turning of a prior art castered steer wheel.
Figure 2:
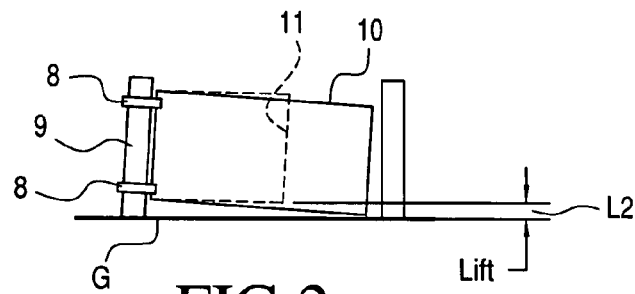
FIG. 2 illustrates the opening of a prior art roadway gate hinged on a slanted post.
Figure 3:
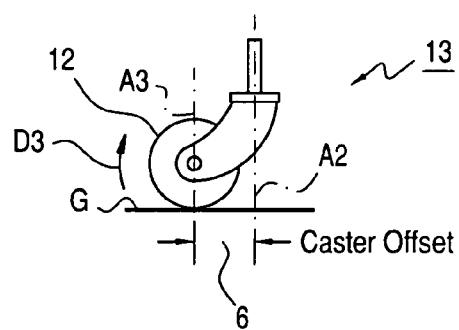
FIG. 3 illustrates a prior art caster wheel.
Figure 4:
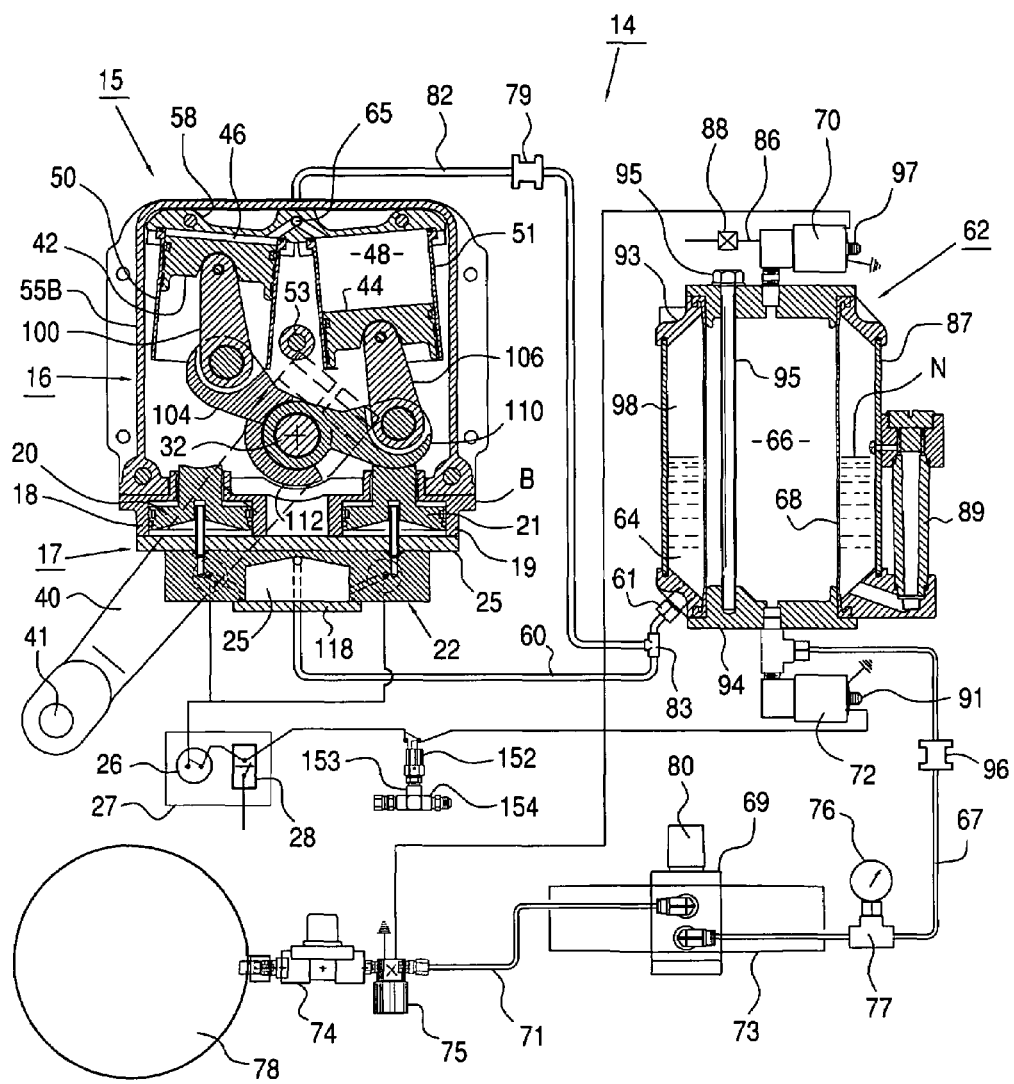
FIG. 4 is a diagrammatic illustration of the fluid and electrical systems of a steer wheel control system according to the invention, and includes elevational cross sections of the centering assembly and the fluid pressurizing accumulator.
Figure 5:
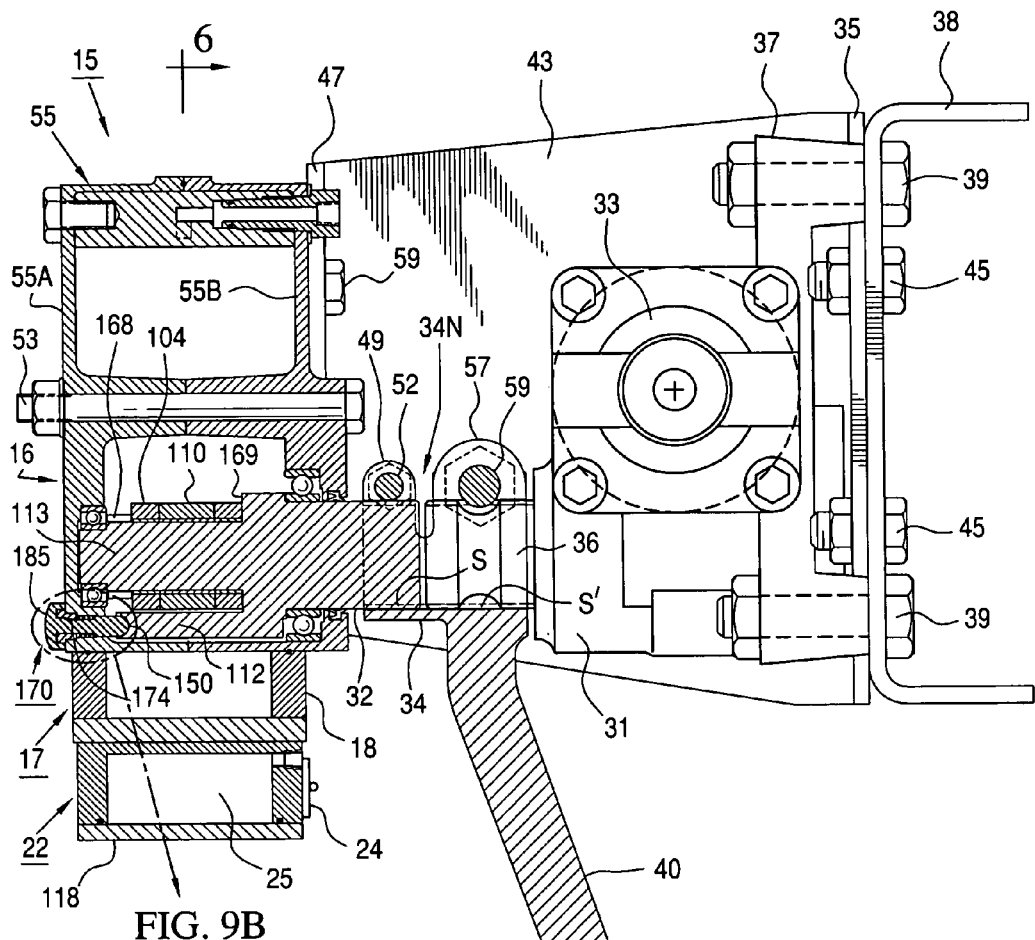
FIG. 5 is a side elevational view showing the centering assembly in a section taken along line 5–5 of FIG. 6 and as connected to the output shaft of the power steering reduction gear of a motor vehicle.
Figures 11, 12:
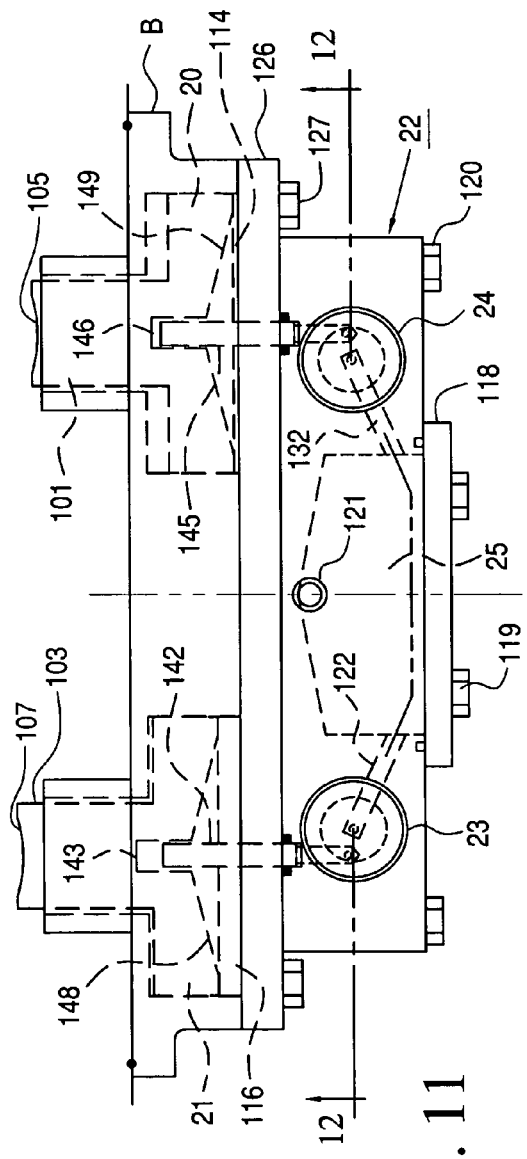
FIG. 11 is an enlarged fragmentary rear view in elevation of a bottom portion of the centering assembly showing details of the solenoids and fluid passages for remotely moving the trim components as illustrated in FIG. 10; and, FIG. 12 is a bottom cross-sectional view of the bottom portion of the centering assembly as taken along line 12–12 of FIG. 11.

As may be seen best in FIGS. 4 and 5, the steer wheel control system 14 of the present invention includes a centering assembly, generally designated 15, comprising a centering unit 16 and a trimming unit 17 contained within a housing 55 having a front section 55A and a rear section 55B, which are secured together by a plurality of bolts 53. Since there are no airtight seals between these sections, the enclosure defined by housing 55 is at ambient pressure. The trimming unit 17 includes a common cylinder block B that defines a pair of trim cylinders 18 and 19 containing a pair of adjustable trim pistons 20 and 21, respectively. Referring now to FIG. 11, the trim cylinders are closed by a single cylinder head 126 bolted to the cylinder block B by bolts 127. A fluid distribution manifold 22 is mounted on end head 126 by bolts 120, and this manifold carries a pair of solenoid actuated trim valves 23 and 24 and contains a fluid distribution chamber 25 and connecting fluid passages and chambers as described below for transferring trim fluid to and from trim chambers 114 and 116 within the respective trim cylinders 18 and 19. Chamber 25 is closed by a cover 118 secured to the manifold 22 by bolts 119.

Valves 23 and 24 are normally closed and are actuated simultaneously to their open positions in response to a driver of the vehicle pushing a trim button 26 to provide electrical power, which causes the valves to be opened by their solenoids against the force of biasing springs. Also, when the electrical system is deactivated by turning off a power supply switch 28, valves 23 and 24 remain closed to maintain the last desired trim condition and preclude any pumping action by the trim pistons that might otherwise introduce air bubbles into the trim chambers. Button 26 and on/off power switch 28 may be located on a control panel 27, which is preferably located at or near the driver's station of the vehicle.

Actuation of the solenoids of trim valves 23 and 24 by pushing the trim button 26 causes these valves to open, which then allows the otherwise static trim pistons 20 and 21 to move freely relative to their respective cylinders 18 and 19. This in turn permits a change in the centered position of the Pitman arm 40 as maintained by the centering unit 16, and a corresponding change in the center position of the steer wheels as explained further below. The trim valves 23 and 24 are opened only momentarily while trim button 26 is held in a depressed position against the bias of a spring pushing against the underside of the button. Thus, the trim adjusting pistons 20 and 21 are actuated only while the button is depressed. Release of the button prevents fluid flow within the header 22 and stops a trim adjustment at the point selected. The trim button and other components mounted on the control panel 27 make it possible for desirable steering corrections to be made while the vehicle is being driven. Should the driver feel through the steering wheel a degree of steer wheel pull that becomes a bother, it is then quickly eliminated by pressing the trim button 26.

Figure 7:
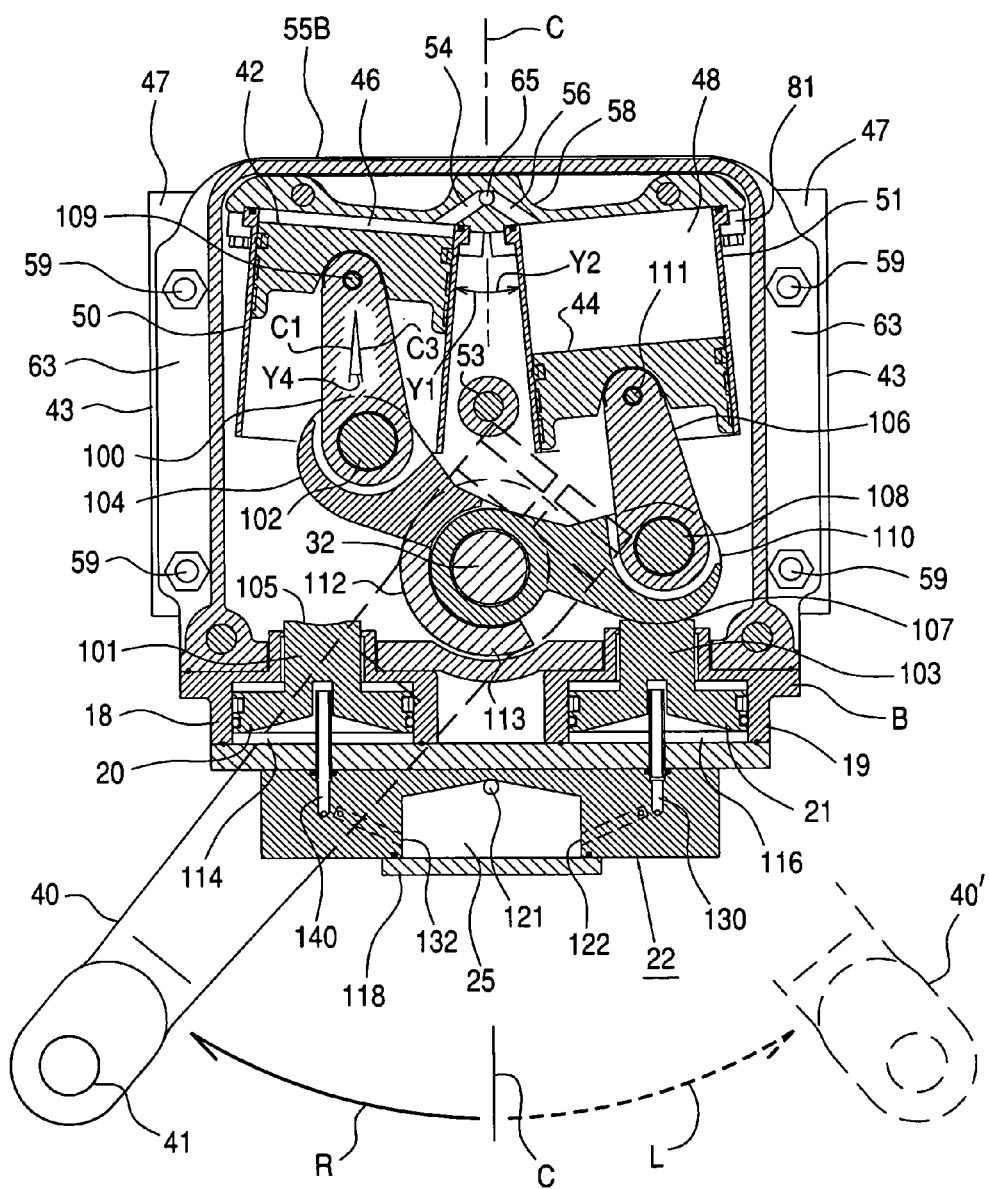
FIG. 7 is a front cross-sectional view in elevation of the centering assembly similar to FIG. 6, but with centering components of the centering assembly in moved positions corresponding to a turning maneuver of the vehicle.

Referring particularly to FIG. 5, a conventional steering gear 31 is carried beneath a conventional power steering unit 33 and both are mounted together on a vehicle frame member 38 by a bracket 37 and a plurality of bolts 39. Similarly, the centering assembly housing 55 is mounted on the frame member 38 by a pair of opposing brackets 43,43, each having an inwardly projecting proximate flange 35 secured to frame member 38 by a plurality of bolts 45 and an inwardly projecting distal flange 47 secured to a corresponding flange 63 on rear housing section 55B by a pair of bolts 59, 59 (FIG. 7).

The centering assembly 15 comprises a centering shaft 32 connected by a coupling sleeve 34 to an output shaft 36 of the reduction steering gear 31. Splines S and S' on the respective ends of shafts 32 and 36 are engaged by and interlock with corresponding internal splines of sleeve 34. Sleeve 34 is notched at 34N to provide two separate clamps, namely, a gear shaft clamp 57 tightened by a bolt 59 and a centering shaft clamp 49 tightened by a bolt 52. Sleeve 34 is also split at 34S so that each clamp has a pair of ears through which its corresponding bolt passes to achieve the clamping action, as illustrated by the ears 57A and 57B through which bolt 59 passes as may be seen best in FIG. 10.

The sleeve 34 preferably serves as the base of and may be formed integrally with a conventional gear shaft lever or "Pitman" arm 40. However, separate clamping sleeves may be utilized, one for the centering shaft 32 and another for the gear shaft lever arm 40. The distal end of lever arm 40 includes the usual aperture 41 for pivotally connecting this arm to a conventional steering rod (not shown) that in turn is pivotally connected to a conventional tie rod that connects in a conventional way the front steer wheels of a motor vehicle. These steer wheels are "steerable" by the steering wheel of the vehicle and are sometimes referred to herein as steerable wheels or members. Steering inputs by the driver via the steering wheel are transmitted to the tie rod via the usual steering column shaft (not shown), the power steering unit 33, the steering gear 31, the Pitman arm 40, and the steering rod.

The components of the steering control system and the way in which they center and stabilize a vehicle steering system will now be described with reference to FIGS. 4–9A. It is to be understood that the components described are connected together by appropriately sized fluid conduits and electrical wires and that these conduits and wires are represented by the lines interconnecting the components as shown in FIG. 4. The centering assembly 15, through the centering shaft 32, the lever-like Pitman arm 40 and the usual steering system linkages, provides a resistance force as described below for resisting movement of the steer wheels (not shown) away from a remotely changeable static center position. The level of this resistance force is adjustable and is dependent upon the amount of fluid pressure applied to a pair of centering pistons 42 and 44 via a pair of centering chambers 46 and 48, respectively, in the centering unit 16.

A pressurized centering fluid is supplied to the centering chambers 46 and 48 via an accumulator port 61, a tee 83, a centering fluid conduit 82, and a port 65 and respective passages 54 and 56 in a common cylinder head 58. Conduit 82 may also optionally contain a flow restriction orifice 79 for enhancing vehicle control in the event of a tire blow out as described further below. A pressurized trim fluid is supplied to the trim chambers 114 and 116 via the accumulator port 61, the tee 83, a trim fluid conduit 60, and a port 121 and associated distribution passages in the manifold 22. The accumulator 62 has an annular liquid chamber 64, a central gas chamber 66 separated from the liquid chamber by a flexible bladder 68, and solenoid operated upper and lower gas dump valves 70 and 72. A liquid trimming fluid is preferred because it is substantially incompressible as compared to a gaseous trimming fluid and therefore provides the capability of locking the trim pistons in their trimmed positions without appreciable slack.

Bladder 68 is preferably made of neoprene. Accumulator 62 also includes an upper head 93 and a lower head 94 spaced apart by an outer housing wall 87 and secured together by peripherally spaced bolts 95, only one of which is shown in FIG. 4. Gas chamber 66 is connected to a compressed gas source 78 via a conduit 67, a pressure gauge 76, a pressure regulator 69, an air pump 73, a conduit 71, a solenoid operated cut-off valve 75, and a low-pressure cut-off valve 74. The gas pressure in chamber 66 is indicated by the pressure gauge 76, which is connected to pressure regulator 69 by a tee 77. The gas is preferably air, and both the bladder 68 and the surrounding housing wall 87 of accumulator 62 are preferably cylindrical.

The gas pressure source 78 may be a pressurized air source, such as an onboard compressor, a vehicle airbrake system or some other conventional air pressure source, and gas pressure is regulated by a control knob 80 on the pressure regulator 69. Preferably, as described in more detail below, centering cylinders 50 and 51, trim cylinders 18 and 19, trim chamber 25 and accumulator 62 are positioned and arranged relative to each other such that any gas bubbles in the trim and centering chambers flow back into the liquid reservoir 64 of the accumulator via the inlet and outlet port 61. Upon entering accumulator 62, the gas bubbles will rise to the liquid and gas interface N such that the gas accumulates in an upper portion of liquid reservoir 64 where it provides a gas cushion 98, which may serve the same purpose as the pressurized gas in chamber 66. Gas chamber 66 should be large enough for liquid chamber 64 to receive the entire volume of fluid from either centering chamber 46 or 48 without unduly collapsing bladder 68. A bleed passage 86 containing a normally closed vent cock 88 allows liquid chamber 64 to be partially filled with hydraulic fluid up to the level of the top of a filler neck 89.

Gas pressure in chamber 66 acts through bladder 68 to store fluid energy received from the hydraulic side of the system, and to maintain fluid pressure on the liquid side of the centering pistons 42 and 44 and trim pistons 20 and 21 until such time as the gas pressure is released to ambient atmosphere by actuation of dump valves 70 and 72 in response to turning off the system with the on-off switch 28. The lower dump valve 72 includes a drain line 91 and has the dual purpose of discharging both gas and any liquid (such as condensed water) accumulating in gas chamber 66. A pressure relief valve (not shown) may communicate with the gas chamber side of the accumulator to provide an upper limit to the resistance and return forces that may be generated by the respective centering pistons acting on the centering shaft 32.

The air pressure in the accumulator 62 is automatically recharged each time the system is turned on, thereby eliminating a recharge maintenance function. The gas chamber 66 of pressure accumulator 62 may be protected from moisture by suitable upstream air filters and/or dryers (not shown). On systems supplied by an air compressor, the discharge from the upper accumulator dump valve 70 may be routed to the compressor inlet filter (not shown) for providing a backflush function to keep this compressor filter clean.

Accumulator 62 allows hydraulic pressure in the centering chambers 46 and 48 to be precisely varied over a relatively wide range because the gas trapped in gas chamber 66 provides a spring-like return force and this chamber may be sized such that the return force does not vary significantly with compressive piston movement. Preferably, the control knob 80 of pressure regulator 69 is used only during installation or maintenance to adjust the pressure setting of the regulator by hand to that desired for normal vehicle operation. By varying the gas pressure in gas chamber 66 through adjusting pressure regulator 69, the break away resistance and the centering return force produced by the centering assembly 15 can be increased or decreased as desired. The range of pressures available should be selected so that the break away resistance can be varied as appropriate for the ranges of weight and steering geometry of the vehicles on which the control system is likely to be used. As an alternative to the regulator 69, the gas pressure control may comprise a manual throttle valve (not shown) in conduit 67, in combination with the pressure gauge 76 to indicate accumulator pressure.

Although the pressure gauge 76 and the regulator 69 may be mounted on the control panel 27, these components are preferably located at or near the pressurized air supply source 78, such as an air tank for the air brakes of a tractor-trailer rig or other large motor vehicle. Pressure regulator 69 is connected to the output of an air pump 73, which is preferably of the type having air driven pistons that will stop automatically when the output pressure reaches the setting of the regulator 69. Pump 73 is driven by a portion of the air from source 78 that flows to ambient and is used to increase the pressure of another portion of the air from source 78 by approximately a factor of two, e.g., from about 125 psig. to about 200–250 psig, this higher pressure air being discharged to accumulator air reservoir 66 via airline 67. The input side of pump 73 is connected to the air source 78 via the conduit 71 containing the solenoid operated air supply valve 75 and the low pressure actuated cutoff valve 74 that closes automatically if the pressure of source 78 falls below a preset lower limit. Supply valve 75 is normally kept open as long as its solenoid receives electrical power from on/off switch 28.

For lighter vehicles, such as automobiles and pickup trucks, the accumulator pressure and other compensator parameters may be chosen so that a linear break away steering force of at least about 50 pounds, preferably at least about 100 pounds, more preferably at least about 150 pounds, and most preferably at least about 200 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 300 pounds, preferably at least about 400 pounds, and more preferably at least about 500 pounds. These turning forces are opposed by equal turning resistances which should be maintained for at least small turning angles away from center, preferably 0°–5°, more preferably 0°–3°, and most preferably within one degree on either side of center.

As it is best to automatically deactivate the control system 14 in the event of a failure of the power steering system, a switch 152 for interrupting electrical power to the solenoid valve 75 may be provided for vehicles with power steering systems. Switch 152 is mounted on a pressure sensor 153 located in a hydraulic line 154 that is in fluid communication with the outlet of the power steering pump (not shown). A loss of pressure at the pump outlet causes switch 152 to open, causing gas supply valve 75 to close and thereby isolate the gas source 78. In addition, the opening of this switch causes solenoid dump valves 70 and 72 to open in the absence of electrical power to their solenoids, thereby rapidly depressurizing chamber 66 by dumping air to ambient respectively from exhaust lines 97 and 91.

Turning off power supply switch 28 also causes supply valve 75 to close and dump valves 70 and 72 to open to quickly depressurize the centering chambers 46 and 48. Thus, the centering assembly 15 may optionally be deactivated for making small radius turns while the vehicle is being driven in the city. Assembly 15 is automatically deactivated upon a loss of electrical power and when the vehicle ignition is turned off. Vent lines 91 and 97 are each preferably of larger capacity than a gas orifice 96 in air supply line 67 to ensure that gas chamber 66 will be depressurized even if gas supply valve 75 fails to close and either dump valve 70 or 72 fails to open with the opening of pressure switch 152 or an inadvertent loss of power.

Figures 6, 6A:
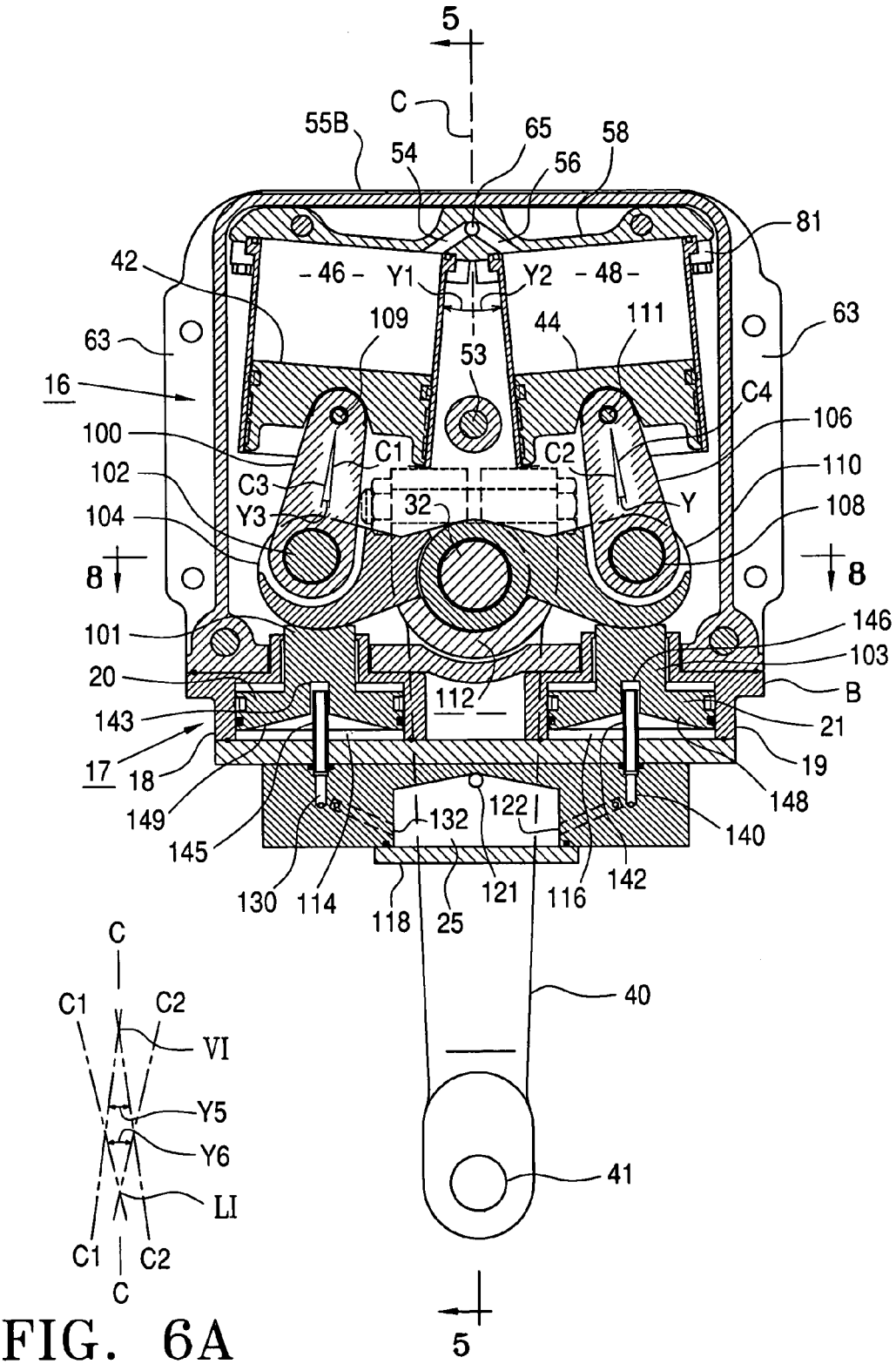
FIG. 6 is a front cross-sectional view in elevation of the centering assembly as taken along line 6–6 of FIG. 5 and shows centering components of the centering assembly in their centered or rest positions.
FIG. 6A is a diagrammatic illustration showing that the centerlines of the centering cylinders may be slanted either upward toward or upward away from each other.

In FIGS. 4 and 7, the centering unit 16 is shown with its centering components in a moved position, and in FIG. 6, the centering unit 16 is shown with its centering components in their rest or centered positions. In both FIGS. 6 and 7, the centering assembly 15 is shown with its trim components in a central, as installed position which may be changed remotely to adjust the center position of both the assembly 15 and the entire steering system as described below.

Referring to FIGS. 6 to 9A, there is shown a specific structural arrangement of the components for actuating and trimming the centering pistons 42 and 44. The centering cylinder housing 55 encloses two separate centering cylinders 50 and 51, the adjacent outer ends of which are closed and connected together by a common cylinder head 58 to which the ends are secured by a series of bolted clamps 81. The cylinders 50 and 51 contain the centering pistons 42 and 44, respectively. Both pistons 42 and 44 are arranged for compressive movement toward the head 58, piston 42 compressing fluid in centering chamber 46 and piston 44 compressing fluid in centering chamber 48 within cylinders 50 and 51, respectively. The pressurized fluid, preferably a liquid, is provided to chambers 46 and 48 from the fluid reservoir 64 of accumulator 62 via the supply line 82 to housing 55, a common housing port 65, and respective internal passages 54 and 56 in cylinder head 58.

The distal end of a centering rod 100 is fastened to the inner side of centering piston 42 by a transverse pivot pin 109, and the distal end of a centering rod 106 is fastened to the inner side of centering piston 44 by a transverse pivot pin 111. The actuating means for these pistons and rods is a pair of push arms 104 and 110, arm 104 being pivotally connected at its distal end to rod 100 by a pin 102 and arm 110 being pivotally connected at its distal end to rod 106 by a pin 108. The proximate ends of arms 104 and 110 are separately mounted on-centering shaft 32 such that each of these arms is arranged for pivotal movement independently of the other around this common shaft and its fixed rotational axis. As an alternative, the proximate ends of arms 104 and 110 may be separately mounted around some other fixed pivot axes that may be common or different and that are substantially parallel to or coincident with the centering shaft rotational axis.

Referring now to FIG. 7, a stop element in the form a trim rod 101 is arranged to engage a distal portion of push arm 104 on its side opposite to piston 42 to define the rest position of piston.42, and a stop element in the form a trim rod 103 is arranged to engage a distal portion of push arm 110 on its side opposite to piston 44 to define the rest position of piston 44. Preferably, rod 101 has a face 105 contoured to the shape of the abutting portion of arm 104 and rod 103 has a face 107 contoured to the shape of the abutting portion of arm 110. These trim rod faces also define the neutral position of an actuator bar 112 such that push arm 104 rests against face 105 and push arm 110 rests against face 107 with bar 112 held therebetween in its neutral position by fluid pressure in centering chambers 46 and 48 when there is no steering force capable of producing turning movement of centering shaft 32.

The actuator bar 112 preferably is a single piece having an arcuate shape and arranged to move in an arc around the rotational axis of centering shaft 32. Although the actuator bar is shown as a single arcuate piece, this arcuate means may instead be two separate bars having any desired cross-sectional shape and located at respective positions corresponding to the two actuating side edges of the single arcuate bar. As a further alternative, the arcuate means may move in an arc around an actuating axis that is substantially parallel to or coincident with the centering shaft rotational axis, such as single or dual bars carried on a base independently mounted for reciprocal rotation and driven by the centering shaft via a gear train.

The retracted position of each centering piston is defined by the respective stop surfaces 105 and 107 of trim rods 101 and 103. Accordingly, the fluid pressurization system described above constantly biases the push arms of the centering pistons 42 and 44 into simultaneous firm engagement with both of the trim stops 105 and 107 at all times when the control system is activated and the centering assembly is in its centering position so that there is no significant slack or drift at any time during its operation (preferably less than one-ten thousandth of an inch of either trim piston).

Figure 8:
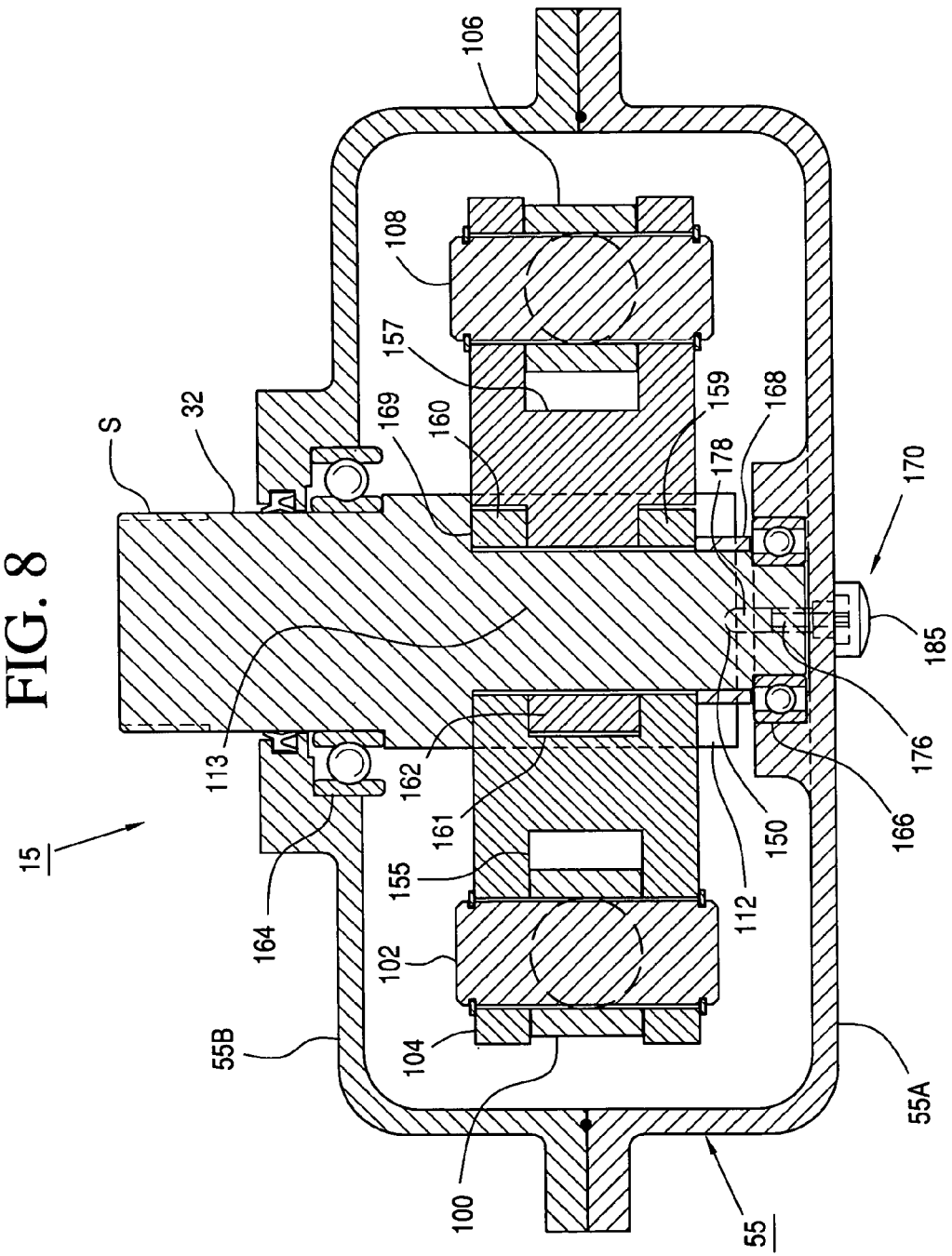
FIG. 8 is a plan cross-sectional view of the centering assembly as taken along line 8–8 of FIG. 6.
Figure 9A:
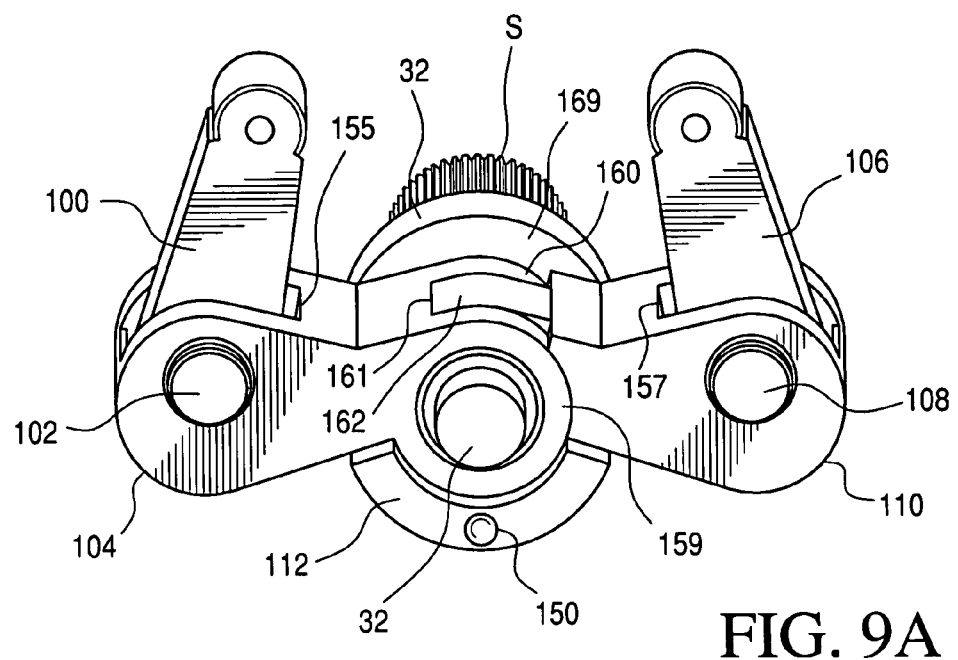
FIG. 9A is an enlarged perspective front view showing details of the centering piston rods as articulated from push arms which in turn are pivotally mounted on a common centering shaft.

Bar 112 projects from a transverse face 169 of centering shaft 32 in a direction parallel to its rotational axis so as to pass beyond the push arms as may be seen best in FIGS. 5, 8 and 9A. As indicated by these figures, axially projecting bar 112 may be formed integrally with shaft 32 by machining away an outer portion of shaft 32 to leave arcuate bar 112 as an outer segment, and also machining away an intermediate outer portion of shaft 32 to form an inner axle 113 of smaller diameter for rotationally supporting push arms 104 and 110. Push arm 104 has a slot 155 for receiving the proximate end of rod 100, and push arm 110 has a slot 157 for receiving the proximate end of rod 106. Push arm 104 also has a pair of opposing ears 159, 160 forming a slot 161 for receiving a leg 162 of push arm 110 so that both of push arms 104 and 110 are arranged for coaxial pivotal rotation around the rotational axis of centering shaft 32. A base portion of arm 104 that includes ear 160 is held in abutment with a transverse face 169 of shaft 32 by a spacer sleeve 168. The centering shaft 32 is mounted for rotation in housing 55 by a bearing 164 in rear section 55B and a bearing 166 in front section 55A.

Arcuate bar 112 is thereby arranged to serve as an actuator of the push arms by providing opposite side edges for independently engaging a proximate portion of each push arm to drive it away from its rest position upon rotation of the centering shaft 32 in response to a turning movement of the Pitman arm 40 and the steer wheels connected thereto. Thus, a full turning movement to the right moves the Pitman arm 40 in the direction of arrow R from its center position C to its solid line position shown in FIG. 7 and this produces a corresponding clockwise rotation of centering shaft 32, which in turn causes bar 112 to independently drive arm 104, rod 100 and centering piston 42 to the compressive positions shown in FIG. 7. Similarly, a full turning movement to the left moves the Pitman arm 40 in the direction of arrow L from its center position C to its broken line position 40' shown in FIG. 7, and this produces a corresponding counterclockwise rotation of centering shaft 32, which in turn causes bar 112 to independently drive arm 108, rod 106 and centering piston 44 to compressive positions that are a mirror image of those shown in FIG. 6 for arm 104, rod 100 and centering piston 42.

Referring now to FIGS. 6 and 6A, the central axis C1 of centering piston 42 and cylinder 50 may be either parallel to or form an acute angle with the central axis C2 of centering piston 44 and cylinder 51. This acute angle may be formed by slanting the upper end of one cylinder wall and its axis toward the upper end of the other cylinder wall and its axis, or by slanting the lower end of one cylinder wall and its axis toward the lower end of the other cylinder wall and its axis. It follows that using the former slant produces converging upper ends and diverging lower ends, and that using the latter slant produces diverging upper ends and converging lower ends.

More specifically, as illustrated diagrammatically in FIG. 6A, slanting the upper end of central axis C1 toward the upper end of central axis C2 produces an upper intersection VI of these axes defined by a convergent angle Y5 that may be in the range of 0 to 60 degrees, preferably 0 to 16 degrees, and more preferably about 10 degrees. Similarly, slanting the lower end of central axis C1 toward the lower end of central axis C2 produces a lower intersection L1 defined by a convergent angle Y6 that may be in the range of 0 to 60 degrees, preferably 0 to 16 degrees, and more preferably about 10 degrees. The angular positions of the two piston and cylinder combinations also may be defined relative to centerline C—C of the assembly housing 55 as illustrated in FIG. 6. For example, the acute angles Y1 and Y2 between centerline C—C and the respective axes C1 and C2, where the upper ends of these axes converge because the walls of cylinders 50 and 51 are both slanted toward centerline C—C, may be in the range of 0 to 30 degrees, preferably 0 to 8 degrees, and more preferably about 5 degrees.

In the most preferable arrangement, the axes and walls of cylinders 50 and 51 are slanted toward each other so that their upper ends converge from respective sides of centerline C—C at acute angles Y1 and Y2 of about 5 degrees each. This arrangement provides a compact symmetrical structure that minimizes the size of the housing 55 while yielding the desired centering forces through turning angles requiring the Pitman arm 40 to swing through angles of about 40 degrees to either side of centerline C—C. This arm swing in direction R preferably produces a stroke of piston 42 of about 2 inches and a pivoting of centerline C3 of rod 100 from an angle Y3 of about 8 degrees to the outside of cylinder centerline C 1 (FIG. 6) to an angle Y4 of about 8 degrees to the inside of cylinder centerline C1 (FIG. 7). In the same manner, a Pitman arm swing in the direction L will preferably produce a stroke of piston 44 of about 2 inches and a pivoting of centerline C4 of rod 106 through an angle Y from about 8 degrees to the outside (FIG. 6) to about 8 degrees to the inside (not shown) of cylinder centerline C2.

After arcuate movement of actuating bar 112 is initiated upon breakaway, the steering force required to sustain movement is a function of the pressure in the accumulator gas chamber 66, as well as of other centering phenomena acting on the steering system, such as positive wheel caster. Also after break away, accumulator pressure acting on the off-center piston, such as piston 42 in FIG. 7, provides a return force that is effective over the entire range of turning angles, which for highway vehicles is usually limited to about 45° on either side of the center wheel position (the 0° position).

Figure 9B:
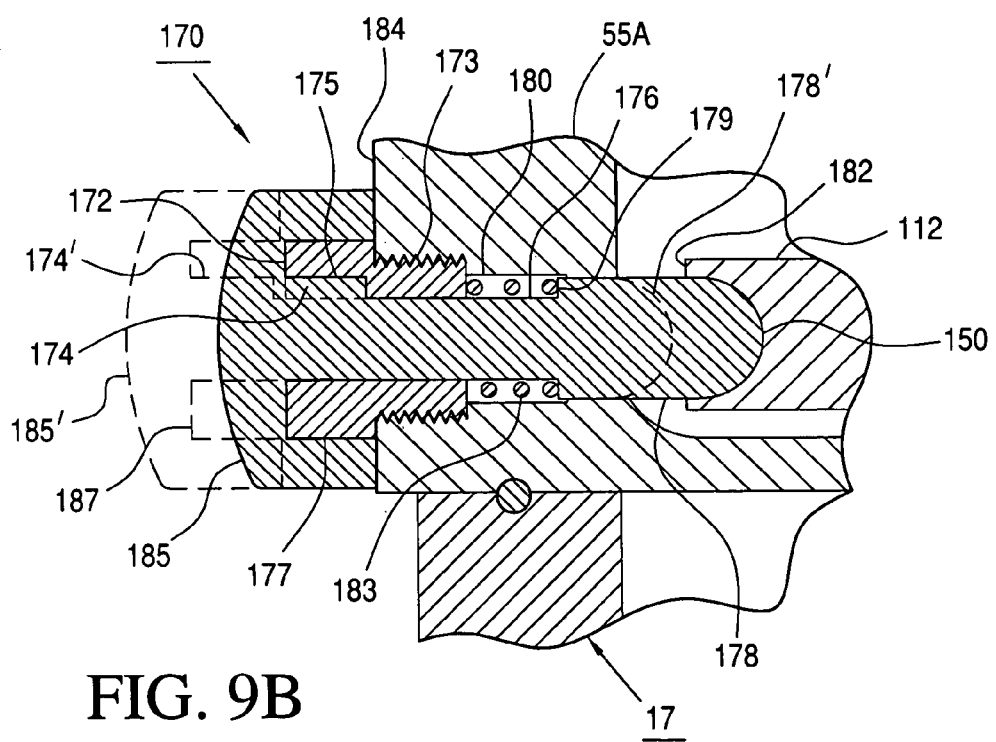
FIG. 9B is an enlargement of the area within circle 9B of FIG. 5 showing details of an indicator for setting an initial steering system center position during installation or maintenance.

As may be seen best in FIGS. 8 and 9B, a center position indicator, generally designated 170, is preferably provided to assist an installer in setting the initial centering position of centering shaft 32 without having to see inside the housing 55 when connecting shaft 32 to the steering gear shaft 36. The indicator 170 passes through a stepped bore 180 through the front wall of housing section 55A and includes a plunger having an enlarged head 178 connected to an external cap 185 by a smaller diameter neck 176 and arranged for guided reciprocation in a retaining bushing 173 threaded into the bore 180. A coiled spring 183 around neck 176 is compressed between the inner end of bushing 173 and an opposing face 179 of head 178 to bias a rounded inner end 181 of head 178 into a correspondingly rounded recess 150 in the distal end of arcuate bar 112.

Thus, when bar 112 is not is its centered position for proper installation, the rounded end 181 of head 178 rides out of recess 150 and along the opposing face 182 of bar 112, and cap 185 is pushed outward to project away from the front surface 184 of housing section 55A and thereby visibly indicates that the bar 112 is not properly centered. After installation of the centering assembly 15 has been completed with bar 112 properly centered, the indicator 170 may be withdrawn from contact with the bar 112 by pulling cap 185 and head 178 to their outermost positions as shown by the respective broken lines 185' and 178'. For this purpose, the indicator structure further includes a thin elongated key 174 at the base of neck 176 that is received in a narrow slot 175 when the cap and head are in their solid line positions, and that may be withdrawn to the broken line position 174' and then turned away from slot 175 so as to ride on the outer surface 172 of bushing 173 when the cap and head are in their broken line positions to keep the indicator 170 in its withdrawn state out of contact with bar 112 during normal centering assembly operation.

As previously described, when the solenoids of trim valves 23 and 24 are deactivated, these valves are closed to prevent any fluid flow between trim chambers 114 and 116 on the one hand and fluid distribution chamber 25 on the other hand. When trim button 26 on control panel 27 is pushed to activate the trim valve solenoids, these valves open to allow fluid (preferably an uncompressible liquid) to flow out of one trim chamber into the other trim chamber via distribution chamber 25, and to or from accumulator liquid reservoir 64 via conduit 60, port 121 and distribution chamber 25, thereby allowing trimming movement of trim pistons 20 and 21, as may be seen best in FIGS. 10 to 12. More particularly, when valve 23 is opened, its solenoid retracts a valve element 125 from a seat 124 to allow fluid flow to or from trim chamber 116 via passages 122 and 123, a valve seat chamber 128, passages 129 and 130, and a stand tube 142. Similarly, when valve 24 is opened, its solenoid retracts a valve element 135 from a seat 134 to allow fluid flow to or from trim chamber 114 via passages 132 and 133, a valve seat chamber 138, passages 139 and 140, and a stand tube 145.

Figure 10:
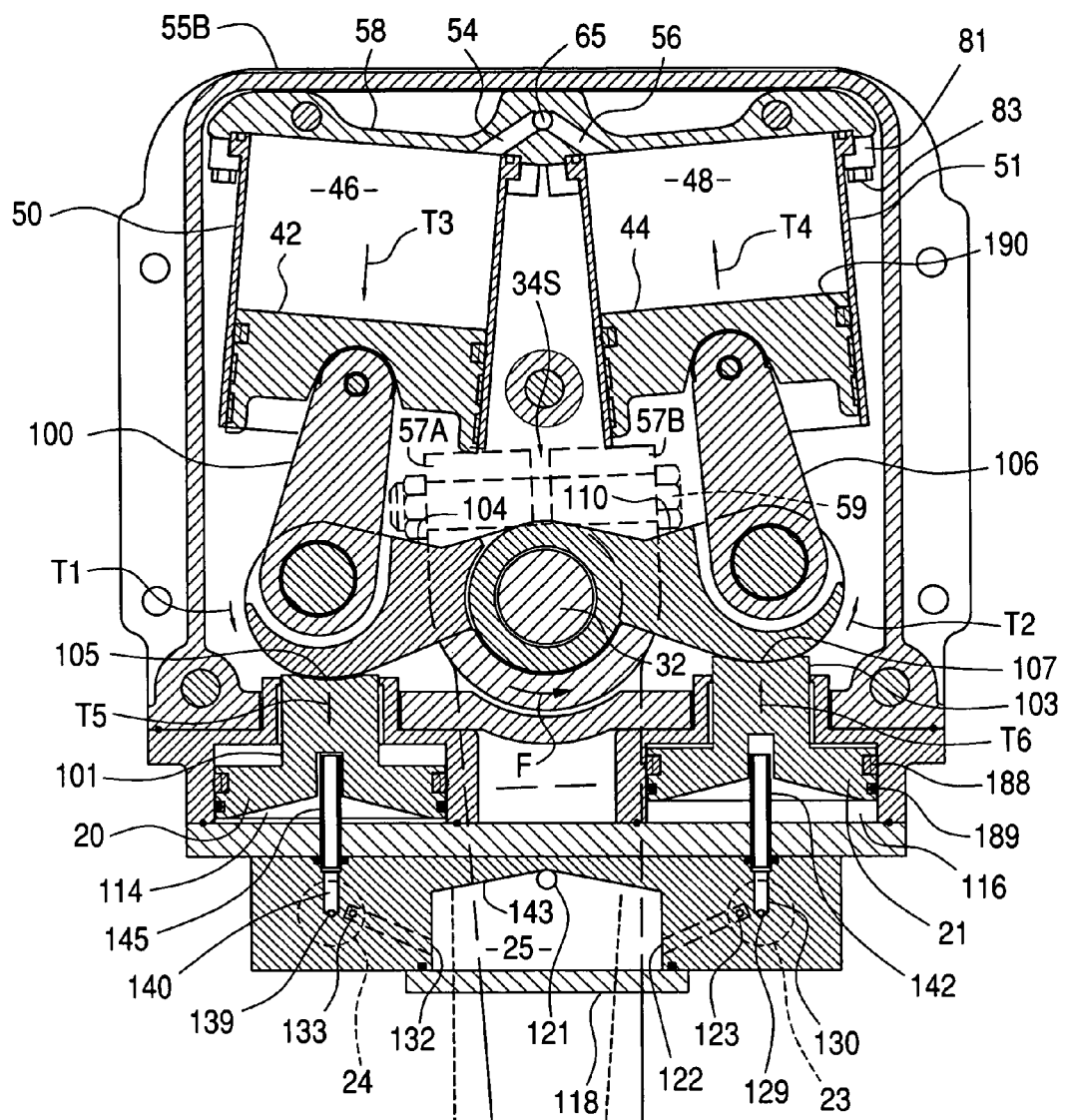
FIG. 10 is a front elevational cross-sectional view of the centering assembly similar to FIG. 6, but with trim components of the centering assembly in moved positions that were achieved remotely for changing the center position of the vehicle steering system.

A trimming example is illustrated in FIG. 10, wherein the Pitman arm 40 has been moved in the direction of arrow LT from an old center position P 1 shown in broken lines to a new center position P2 shown in solid lines by pushing the trim button 26 momentarily to open the trim valves while the vehicle driver was holding the usual steering wheel (not shown) at a new position toward the left with a steering force that was required to keep the vehicle on a straight ahead course. With the valves open, this steering force caused arcuate bar 112 to rotate in the direction of arrow F, the push arms 104 and 110 to pivot in the direction T1 and T2, respectively, and the trim pistons 20 and 21 to move linearly in the direction T3 and T4, respectively, which in turn caused push arm 104 to push stop 105 and trim piston 20 downward in the direction of arrow T5 against fluid pressure in trim chamber 114 and allowed fluid pressure in trim chamber 116 to push trim piston 21 and stop 107 upward against push arm 110.

When the trim button 26 was released after being pushed momentarily, the solenoids of trim valves 23 and 24 were deactivated to re-close these valves and lock the trim pistons 23 and 24 in their new positions, which thereby established a new centering position of the centering shaft 32 for maintaining the newly selected center position of the Pitman arm 40 at P2 when the steering wheel is released. In this same manner, the Pitman arm 40 may be moved in the direction of arrow RT from an old center position P2 shown in solid lines to a new center position P1 shown in broken lines when the trim button 26 is pushed momentarily and then released while the vehicle driver is holding the steering wheel at a new position toward the right with a steering force that is required to keep the vehicle on a straight ahead course.

A particularly important aspect of the invention is a self-bleeding feature provided by the stand tubes 142 and 145 in combination with conical faces 148 and 149 on the pressure side of pistons 21 and 20, respectively, and a conical surface 143 on the upper side of chamber 25 adjacent to the port 121, which serves as both an inlet to and an outlet from chamber 25. The stand tubes 142 and 145 fit snuggly in (but not tightly enough to form a gas seal) and are arranged to reciprocate within respective trim piston bores 143 and 146 with a pumping action that causes any gas in these bores to be bled away (expelled) through the stand tubes. These features prevent any gas bubbles inadvertently introduced into the trim liquid from being trapped and accumulating in the trim chambers 114 and 116, which could cause the centering position maintained by the trim pistons to drift from that desired because of the highly compressible nature of any trapped gas.

As shown in the drawings, the centering assembly 15 is preferably oriented vertically with the centering unit 16 adjacent its upper end and the trim unit 17 adjacent its lower end. Therefore, any gas bubbles entering the trim chambers will rise into the bores 143 and 146 and will be expelled therefrom into the distribution chamber 25 by downward pumping movements of the trim pistons during subsequent trimming adjustments. It is also preferable that the inlet/outlet port 61 of accumulator 62 be located at a level higher than the port 121 so that any gas bubbles returned to chamber 25 and rising up to port 121 will similar rise from this port back to the liquid reservoir 64 of the accumulator.

For sealingly engaging their corresponding trim cylinders 18 and 19, trim pistons 20 and 21 each carry dual circumferential seals 188 and 189, seal 188 comprising an inner seal of square cross section and seal 189 comprising outer seal of oval or round cross section to provide a close tolerance seal arrangement for substantially preventing any leakage past the trim pistons. This precludes any significant drift of the trim pistons away from their locked positions for setting the on-center position of centering bar 12. Similar close tolerance dual seals may also be provided on-centering pistons 42 and 44, which also carry a sealing piston ring 190.

The air chamber 66 of accumulator 62 may be pressurized by air to a pressure of, for example, 200–250 psi to provide the same pressure in each of the centering chambers 46 and 48. If the diameter of each of the pistons 42 and 44 is 3.23 inches, an accumulator pressure of 200–250 psi will provide a linear resistance force of 500–550 pounds as measured at the Pitman arm aperture 41 for opposing off-center movement of the steer wheels. Since many conventional steering system geometries provide a linear resistance force of about 15 to 20 pounds as measured at aperture 41, the present invention may be used to increase the resistance and re-centering forces of these steering systems by a multiple of about 5 to about 30 or more, preferably about 10 to about 25. A resistance force of 500 to 550 pounds at the tie rod is particularly effective in eliminating the adverse effects of crosswinds on large vehicles.

The trim pistons in the trim cylinders preferably have a stroke of less than one inch, more preferably about one-half inch, and the hydraulic fluid in the short trim cylinders is trapped in trim chambers 114 and 116 by closure of valves 23 and 24, thereby creating a hydraulic lock that holds the centering stop of each trim piston in a selected on-center position. The average trim corrections may be on the order of a few one-thousandths of an inch. Therefore, the tolerance for backlash (rebound) or drift in either direction of the trim pistons in the trim cylinders is preferably held to one-thousandth of an inch or less.

As an option, the centering liquid supply conduit 82 may contain a flow restriction orifice 79 to limit the rate of fluid flow into and out of centering chambers 46 and 48. Alternatively, reservoir outlet 61, tee 83 or cylinder head port 65 may be sized to provide this flow restriction. For a centering system having the foregoing characteristics, the flow restriction orifice 79 may be sized at a diameter of about one-eighth inch. This passage size should not significantly affect off-center and return to center movements of the actuator 112 during normal steering and turning maneuvers in response to movements of the vehicle steering wheel. However, excessively rapid movement of the tie rod, such as may be caused by blowout of a steerable wheel tire, is viscously dampened by the flow resistance of orifice 79 so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chambers from 250 psi to about 400 psi, the latter applying a linear force of about 700 pounds at lever arm aperture 41.

It is also important to recognize that the centering unit of the present invention engages the vehicle steering system at a location between the steer wheels and the reduction steering gear 31. As a result, spurious inputs from the steering wheel column and/or from the power steering unit 33 are absorbed by the centering assembly 15 before these inputs can reach the steer wheels. Likewise, spurious forces transmitted from the roadway are immediately absorbed in the centering unit, rather than being transmitted through the entire steering assembly before encountering any stabilizing resistance from the steering wheel. As a result, the centering assembly 15 protects the interior components of the steering assembly from the wear caused by repeated oscillations between states of tension and compression.

A number of modifications and alterations are possible without departing from the scope of the present invention. For example, internal passageways and check valves similar to those described in my U.S. Pat. No. 5,536,028 may be provided within the trim fluid manifold 22 so that the trim valve means may comprises a single solenoid actuated trim valve for alone controlling fluid flow between the trim chambers 114 and 116 and between each of these chambers and the distribution chamber 25. As a further example, although dual trim pistons are preferred, a single trim piston could be used if its associated centering piston had a pressure side area somewhat larger than the pressure side area of the other centering piston, such that the arcuate bar could alone serve as the trim stop for the other centering piston. Even though the breakaway and return forces would be somewhat greater for turns toward the side with the larger piston than for turns toward the side with the smaller piston, the power steering unit could compensate for this difference so that it would have no appreciable effect on steerage of the vehicle.

Another possible modification is that the important trimming feature of the invention may be achieved through drive means other than the hydraulic trimming pistons 20 and 21. For example, movement of the trim rods 101 and 103 may be accomplished by controllably varying their positions with small reversible electric motors mounted on the housing 55 in place of the manifold 22. Such trimming arrangements are described in the my prior U.S. Pat. No. 4,418,931; U.S. Pat. No. 4,534,577; and U.S. Pat. No. 5,536,028; the entire contents of which are incorporated herein by reference. However, the hydraulic trimming arrangement shown in the drawings is preferably for its precision, simplicity and ease of installation on a wide variety of vehicles.

As an alternative to manual adjustment, the output pressure of regulator 69 may be adjusted by a reversible electric motor controlled by an on-board computer (not shown), such as that shown and described in U.S. Pat. No. 5,536,028 which is incorporated herein by reference. The gas pressure in gas chamber 66 and the resulting resistance and centering forces may thereby be made automatically responsive to the speed of the vehicle to provide a "speed sensitive" centering force to the vehicle's steering system. It may be desirable in some applications that the resistance to turning movements away from the center position be increased automatically as the speed of the vehicle increases because the effects of small off-center movements in response to spurious steering inputs increase dramatically with vehicle speed.

The invention may be used with various steering and/or tie rod arrangements and with steering systems that do not require a steering rod or a tie rod, e.g., those with only one steerable member such as the rudder of a ship or an airplane. The variable resistance and return force section of the invention can be used alone as a centering unit without the integral remote trimming section disclosed herein. On the other hand, the remote trimming section of the invention may be used with centering mechanisms of the prior art. Thus, the remotely operable trimming section of the present invention can be combined with centering devices of known types to provide adjustment of the center position during vehicle operation.

Also, one or more of the resistance components or remote trimming components of the present invention may be combined with one or more such components as disclosed in my prior U.S. Pat. Nos. 4,410,193; 4,418,931; 4,534,577; 5,527,053; 5,536,028; 6,003,887; 6,267,395; U.S. Pat. No. 6,422,582; U.S. Pat. No. 6,520,519; U.S. Pat. No. 6,520,520; and U.S. Pat. No. 6,530,585, the entire contents of each of these patents being expressly incorporated herein by reference. In addition, a number of other modifications to both the variable resistance components and to the trimming components specifically disclosed herein are possible without departing from the scope of the invention as defined by the claims set forth below.

What is claimed is:

1. An apparatus for positioning at least one steerable member connected to a steering shaft for movement to either side of a selected center position in response to rotational reciprocation of a steering shaft, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a shaft axis, a rotational position of said centering shaft defining a centering position corresponding to said selected center position;

a first centering piston cooperating with a first centering cylinder to define a first centering chamber;

a second centering piston cooperating with a second centering cylinder to define a second centering chamber, each of said first and second centering pistons being arranged to reciprocate independently of the other between a rest position and an active position for compressing a fluid within its corresponding chamber;

actuator means comprising first push means for causing compressive movement of said first centering piston, second push means for causing compressive movement of said second centering piston, and arcuate means driven by said centering shaft for arcuate movement around an actuating axis to either side of a neutral position corresponding to said centering position in response to rotational reciprocation of said centering shaft, said arcuate means being arranged to engage each of said first and second push means independently of the other so that rotation of said centering shaft away from said centering position to one side causes compressive movement of said first centering piston without moving said second centering piston and rotation of said centering shaft away from said centering position to the other side causes compressive movement of said second centering piston without moving said first centering piston; and, centering fluid means for providing a pressurized fluid in each of said first and second centering chambers so that fluid pressure against said centering pistons provides said holding force by opposing movement of said steerable member toward either side of said selected center position and provides a return force continuously biasing said steerable member toward said selected center position during movement of said steerable member to either side of said selected center position, the rest position of each of said centering pistons corresponding to the neutral position of said arcuate means, and said fluid pressure causing each of said centering pistons to bias said arcuate means toward said neutral position during said compressive movement.

2. An apparatus according to claim 1, wherein said first push means comprises a first push arm and said second push means comprises a second push arm, wherein each of said push arms have one end pivotally connected to a corresponding centering piston and another end mounted for pivotal movement around a corresponding fixed pivot axis, and wherein said arcuate means comprises at least one elongated bar extending substantially parallel to said actuating axis.

3. An apparatus according to claim 2, wherein said bar has an arcuate cross-sectional shape in a plane transverse to said actuating axis, wherein a first side edge of said bar is position to engage said first push arm and a second side edge of said bar is position to engage said second push arm, and wherein said actuating axis and said fixed pivot axes are substantially parallel to or coincident with said shaft axis.

4. An apparatus according to claim 1 further comprising trim means operable from a location remote from said resistance means for changing said centering position to vary the selected center position of said steerable member.

5. An apparatus according to claim 4, wherein said trim means engages at least one of said push means to change the neutral position of said arcuate means.

6. An apparatus according to claim 5, wherein said trim means simultaneously engages both of said push means to change the neutral position of said arcuate means.

7. An apparatus according to claim 4, wherein said trim means comprises:
a first trim piston cooperating with a first trim cylinder to define a first trim chamber and having a first stop element for engaging said first push means;
a second trim piston cooperating with a second trim cylinder to define a second trim chamber and having a second stop element for engaging said second push means,
and trim fluid means for selectively providing a flow of a trim liquid to and from each of said trim chambers, each of said trim piston being movable relative to its trim cylinder to cause said flow and thereby vary said center position by changing the neutral position of said arcuate means.

8. An apparatus according to claim 7, wherein said first push means comprises a first push arm having one end pivotally connected to said first centering piston and another end mounted for pivotal movement around said centering shaft, wherein said second push means comprises a second push arm having one end pivotally connected to said second centering piston and another end mounted for pivotal movement around said centering shaft, and wherein said first stop element engages said first push arm and said second stop element engages said second stop element when said arcuate means is in its neutral position.

9. An apparatus according to claim 8, wherein said arcuate means comprises a bar projecting from said centering shaft in a direction substantially parallel to a rotational axis thereof and having an arcuate cross-sectional shape in a plane transverse to said shaft rotational axis.

10. An apparatus according to claim 7, wherein said trim fluid means comprises:
a source of said trim liquid,
trim fluid supply means for providing a flow of trim liquid between said source and said trim chambers,
trim valve means operable between a closed position for preventing trim liquid flow from each of said trim chambers and an open position for allowing said trim pistons to move relative to said trim cylinders, said trim piston movements causing trim liquid to flow into one of said trim chambers and trim liquid to flow out of the other of said trim chambers,
and operating means activatable from said remote location for operating said trim valve means between said closed and open positions.

11. An apparatus according to claim 10,
wherein said trim liquid source is an accumulator means having a trim fluid reservoir for holding a supply of said trim liquid,
wherein said supply means comprises:
first conduit means for providing fluid communication between said trim reservoir and said first trim chamber, and comprising a first valve port,
second conduit means for providing fluid communication between said trim reservoir and said second trim chamber, and comprising a second valve port,
and wherein said trim valve means comprises:
a first valve member arranged for reciprocating movement between a closing position for closure of said first valve port and an opening position for opening of said first valve port,
a second valve member arranged for reciprocating movement between a closing position for closure of said second valve port and an opening position for opening of said second valve port,
and actuating means for actuating said first and second valve members to provide simultaneous opening and closure of said first and second valve ports.

12. An apparatus according to claim 11, wherein said accumulator means further comprises a housing wall and an interior wall cooperating with said housing wall to define an annular trim fluid reservoir.

13. An apparatus according to claim 7, wherein at least one of said trim cylinders is oriented vertically such that its corresponding trim chamber is beneath its corresponding trim piston, wherein said corresponding trim piston comprises a pressurized side having an inverted cavity leading to an inverted bore for collecting any gas bubbles in said trim liquid, wherein said trim fluid means comprises a stand tube in fluid communication with a fluid chamber and arranged to fit within said bore such that reciprocal movement of said corresponding trim piston causes self-bleeding of said cavity by expelling collected gas from said bore to said fluid chamber via said stand tube.

14. An apparatus according to claim 1, wherein said centering fluid is a centering liquid, and wherein said centering fluid means comprises:
   accumulator means having a housing wall and an interior wall cooperating with said housing wall to define a centering fluid reservoir for holding a supply of centering liquid,
   and centering conduit means for providing a flow of centering liquid between said reservoir and said centering chambers.

15. An apparatus according to claim 14, wherein the interior wall of said accumulator means comprises a flexible diaphragm defining a gas chamber; and wherein said apparatus further comprises means for pressurizing said gas chamber with a gas to cause said diaphragm to pressurize the liquid in said reservoir, and means for controllably varying the pressure of said gas so as to vary said liquid pressure.

16. An apparatus according to claim 1 for a vehicle having a power steering unit for providing steering power to said steerable member, said apparatus further comprising means for preventing said fluid pressure in the absence of steering power from said power steering unit.

17. An apparatus according to claim 1, wherein said arcuate means comprises a face extending transversely to said actuating axis and having a recess located at a centered location corresponding to an initial centering position of said centering shaft, and wherein said apparatus further includes an indicator means for indicating when said centering shaft is in said initial centering position, said indicator means comprising:
   a head at an inner end of an indicator shaft and receivable in said recess when said centering shaft is in said initial centering position,
   a cap at an outer end of said indicator shaft and arranged to extend away from an exterior wall of said apparatus when said head is not in said recess,
   and means for biasing said indicator shaft inward toward said face, said head being positioned so that it is biased into said recess when said centering shaft is in said initial centering position, and said cap being extendable away from the exterior wall against said bias by an interaction between said head and said recess when said centering shaft rotates away from said initial centering position.

18. An apparatus according to claim 1, wherein an axis of said first cylinder is parallel to or makes an acute angle with an axis of said second cylinder, said acute angle being at either an upper or a lower intersection of said axes.

19. An apparatus for holding at a selected center position at least one steerable member moveable to either side of the selected center position in response to rotational reciprocation of a steering shaft by steering forces, said apparatus comprising resistance means for providing a holding force resisting steering forces tending to move said steerable member to either side of the selected center position, trim means operable from a location remote from said resistance means for changing the selected center position of said steerable member, and accumulator means for holding a supply of fluid and means for pressurizing the fluid held in said accumulator means;
wherein said resistance means comprises:
   a centering shaft and means for connecting said centering shaft to the steering shaft for rotational reciprocation therewith, a rotational position of said centering shaft defining a centering position corresponding to said selected center position,
   a first centering piston cooperating with a first centering cylinder to define a first centering chamber,
   a second centering piston cooperating with a second centering cylinder to define a second centering chamber, each of said first and second centering pistons being arranged to reciprocate independently of the other between a rest position and an active position for compressing a fluid within its corresponding chamber,
   actuator means comprising first push means for causing compressive movement of said first centering piston, second push means for causing compressive movement of said second centering piston, and arcuate means connected to said centering shaft for arcuate movement around an axis to either side of a neutral position corresponding to said centering position in response to rotational reciprocation of said centering shaft, said arcuate means being arranged to engage each of said first and second push means independently of the other so that rotation of said centering shaft away from said centering position to one side causes compressive movement of said first centering piston without moving said second centering piston and rotation of said centering shaft away from said centering position to the other side causes compressive movement of said second centering piston without moving said first centering piston; and,
   centering fluid means for providing a flow of centering fluid between said accumulator means and each of said first and second centering chambers so that fluid pressure against said centering pistons provides said holding force by opposing movement of said steerable member toward either side of said selected center position and provides a return force continuously biasing said steerable member toward said selected center position during movement of said steerable member to either side of said selected center position, the rest position of each of said centering pistons corresponding to the neutral position of said arcuate means, and said fluid pressure causing each of said centering pistons to bias said arcuate means toward said neutral position during said compressive movement;
and wherein said trim means comprises:
   a first trim piston cooperating with a first trim cylinder to define a first trim chamber and having a first stop element for engaging said first push means;
   a second trim piston cooperating with a second trim cylinder to define a second trim chamber and having a second stop element for engaging said second push means,
   and trim fluid means for selectively providing a flow of trim fluid between said accumulator means and each of said trim chambers such that each of said trim pistons is movable relative to its trim cylinder to vary said center position by changing the neutral position of said arcuate means, said trim fluid means comprising trim valve means operable between a closed position for preventing said trim fluid flow so that said trim pistons are held in a locked position, and an open position for allowing said trim fluid flow so that said trim pistons are free to move away from said locked position in said trim cylinders, said movement of the trim pistons causing trim fluid flow to one of said trim chambers and trim fluid flow from the other of said trim chambers to permit trimming movement of said steerable member to another center position by changing the centering position of said centering shaft in response to said steering forces.

20. An apparatus according to claim 19, wherein said first push means comprises a first push arm having one end connected to said first centering piston and another end mounted for pivotal movement around said centering shaft, wherein said second push means comprises a second push arm having one end connected to said second centering piston and another end mounted for pivotal movement around said centering shaft, and wherein said first stop element engages said first push arm and said second stop element engages said second stop element when said arcuate means is in its neutral position.

21. An apparatus according to claim 20, wherein said arcuate means comprises a bar projecting from said centering shaft in a direction parallel to a shaft rotational axis and having an arcuate cross-sectional shape in a plane transverse to said shaft rotational axis.

22. An apparatus according to claim 19, wherein said trim fluid is a liquid, and wherein said trim fluid means further comprises:
- a trim fluid reservoir,
- a supply conduit for communicating with said accumulator means to supply trim fluid to said trim fluid reservoir,
- a first port for providing fluid communication between said trim reservoir and said first trim chamber,
- a second port for providing fluid communication between said trim reservoir and said second trim chamber, and wherein said trim valve means comprises:
- a first valve member arranged for reciprocating movement between a closing position for closure of said first port and an opening position for opening of said first port,
- a second valve member arranged for reciprocating movement between a closing position for closure of said second port and an opening position for opening of said second port,
- and actuating means activatable from said remote location for actuating said first and second valve members to provide simultaneous opening and closure of said first and second ports.

\* \* \* \* \*